(12) United States Patent
Nishi et al.

(10) Patent No.: US 8,354,159 B2
(45) Date of Patent: Jan. 15, 2013

(54) POLYAMIDE BASED MIXED RESIN LAMINATED FILM ROLL AND A PROCESS FOR PRODUCING THE SAME

(75) Inventors: Tadashi Nishi, Inuyama (JP); Yoshinori Miyaguchi, Inuyama (JP); Naonobu Oda, Inuyama (JP); Katsuhiko Nose, Osaka (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 187 days.

(21) Appl. No.: 11/922,232

(22) PCT Filed: Dec. 22, 2005

(86) PCT No.: PCT/JP2005/023653
§ 371 (c)(1),
(2), (4) Date: Dec. 14, 2007

(87) PCT Pub. No.: WO2006/137185
PCT Pub. Date: Dec. 28, 2006

(65) Prior Publication Data
US 2009/0324884 A1    Dec. 31, 2009

(30) Foreign Application Priority Data

Jun. 22, 2005 (JP) .................... 2005-182407
Jul. 12, 2005 (JP) .................... 2005-203304

(51) Int. Cl.
*B32B 3/10* (2006.01)
*B29C 47/06* (2006.01)

(52) U.S. Cl. .................... 428/137; 264/173.19

(58) Field of Classification Search .................. 428/137; 264/173.19
See application file for complete search history.

(56) References Cited

U.S. PATENT DOCUMENTS

| | | | | |
|---|---|---|---|---|
| 5,130,383 A | * | 7/1992 | Yoshino et al. | 525/423 |
| 5,741,601 A | * | 4/1998 | Kishida et al. | 428/474.4 |
| 6,319,986 B1 | * | 11/2001 | Amimoto et al. | 525/66 |
| 6,376,093 B1 | * | 4/2002 | Fujita et al. | 428/474.4 |
| 2006/0058424 A1 | * | 3/2006 | Suzuki et al. | 523/200 |
| 2006/0257760 A1 | * | 11/2006 | Mori et al. | 430/7 |

FOREIGN PATENT DOCUMENTS

| | | | |
|---|---|---|---|
| EP | 0719631 A2 | | 7/1996 |
| EP | 0927624 A2 | * | 7/1999 |
| EP | 1754588 A1 | | 2/2007 |
| EP | 1881022 A1 | | 1/2008 |
| EP | 1889717 A1 | | 2/2008 |
| JP | 07-47545 A | | 2/1995 |
| JP | 10-100226 A | | 4/1998 |
| JP | 2000-007801 A | | 1/2000 |
| JP | 2000-052516 A | | 2/2000 |
| JP | 2000-309074 A | | 11/2000 |
| JP | 2002-029014 A | | 1/2002 |
| JP | 2002-166512 A | | 6/2002 |
| JP | 2003-170494 A | | 6/2003 |
| JP | 2004-181777 A | | 7/2004 |
| JP | 2004181777 A | * | 7/2004 |
| JP | 2007-130759 A | | 5/2007 |
| WO | WO 2004016693 A1 | * | 2/2004 |
| WO | WO 2005014270 A2 | * | 2/2005 |

OTHER PUBLICATIONS

Machine_English_Translation of JP_2004/181777_A, Oda et. al., "Polyamide Based Film Roll and its Manufacturing Method", JPO, Jul. 2, 2004, pp. 1-15.*
European Patent Office, Supplemental European Search Report in corresponding European patent application No. 05820145.0 dated Jun. 4, 2009.

* cited by examiner

*Primary Examiner* — David Sample
*Assistant Examiner* — Tahseen N Khan
(74) *Attorney, Agent, or Firm* — Kenyon & Kenyon LLP

(57) ABSTRACT

The present invention provides a polyamide based mixed resin laminated film roll formed by winding up a polyamide based mixed resin laminated film comprising a plurality of polyamide mixed resin sheets stacked on top of each other. A first sample cutout portion is provided within 2 m from the winding end of film, and a final sample cutout portion is provided within 2 m from the winding start of film. The roll is regulated so that, when sample cutout portions are provided at intervals of about 100 m from the first sample cutout portion, for all samples cutout from the cutout portions, the elastomer content, tensile modulus of elasticity, thickness unevenness in the longitudinal direction and other properties fall within a predetermined variation range.

31 Claims, No Drawings

POLYAMIDE BASED MIXED RESIN LAMINATED FILM ROLL AND A PROCESS FOR PRODUCING THE SAME

This is a 371 U.S. national phase application of PCT/JP2005/023653 filed 22 Dec. 2005, claiming priority to Japanese Patent Applications No. 2005-182407 filed 22 Jun. 2005, and No. 2005-203304 filed 12 Jul. 2005, respectively, the contents of which are incorporated herein by reference.

TECHNICAL FIELD

The present invention relates to a film roll by taking up a polyamide based laminated resin film having high quality and homogeneous mechanical properties over a long length, and specifically, to a polyamide-based laminated resin film roll with excellent workability (in particular, workability under high humidity) in use of packaging such as retort food by laminating with a polyolefin based resin film.

BACKGROUND ART

A biaxially oriented polyamide based resin film composed of nylon in major components is excellent in toughness, gas-barrier, pinhole resistance, transparency, printing property and the like, so that it is widely utilized as a packaging material in various kinds of foods such as a variety of liquid food, aqueous food, frozen food, retort food, paste food, cattle meat and aquatic food. Particularly in recent years, it is used extensively in packaging of retort food. Such polyamide based resin film is laminated with polyolefin based resin films such as polyethylene and polypropylene, folded in two parallel to its machine direction, then thermally adhered in three sides and cut out to give a bag with one side opened and three edges sealed in an opened state, in which various kinds of food etc. are filled and sealed, then sterilized by heating in boiling water before being supplied to market.

In the case of using polyamide based resin film, however, there are some instances that warpage occurs at corners of packaging bag after heat sterilization treatment to yield a curling phenomenon of four sides in S-shape (hereinafter called S-shaped curl phenomenon), resulting in remarkable deterioration of appearance as packaging goods. Therefore, regarding a method of reducing such curl phenomenon, as shown in Patent reference 1, there has been proposed a method to adjust a biaxially oriented polyamide based resin film to a specified value of product of its boiling water shrinkage percentage and percentage change of molecular orientation angle in the direction of film width, but the method needs an extremely high temperature in thermal fixation or excess thermal relaxation after stretching to enhance dimensional stability in boiling water treatment, thus it poses problems that the toughness and pinhole resistance of the resultant film are deteriorated.

Therefore, the present inventors have devised and proposed a method for obtaining a biaxially oriented polyamide based resin film free from S-shaped curl phenomenon without lowering toughness and pinhole resistance by adjusting boiling water shrinkage percentage and refraction index of film within a specified numeric range as described in Patent reference 2.
Patent reference 1: Japanese Unexamined Patent Publication Hei 4-103335 (1992)
Patent reference 2: Japanese Unexamined Patent Publication Hei 8-174663 (1996)

DISCLOSURE OF THE INVENTION

Problems to be Solved by the Invention

According to the method of Patent reference 2 described above, it becomes possible to obtain a biaxially oriented polyamide based resin film free from S-shaped curl phenomenon having excellent toughness and pinhole resistance. However, in a bag forming processing by lamination, since conditions of pressure and time in thermal adhesion are finely adjusted for every film roll used, even in the case where the average values of boiling water shrinkage percentage and refraction index of the film winded up in a film roll are in the range of Patent reference 2, when degree of variation in one film roll is large, wrinkle takes place between films each other on lamination in a bag forming processing, which tends to pose troubles such as bad yield ratio.

On the other hand, the present inventors have proposed, in a production method of biaxially stretched film roll by winding up a biaxially stretched film after melt extrusion of a plurality of resins mixed, as a method to reduce variation of coefficient of dynamic friction, a method to reduce segregation of feedstock by homogenizing the shape of feedstock chip or enlarging the angle of slope of a funnel-shaped hopper as a feed section of feedstock into an extruder (Japanese Unexamined Patent Publication 2004-181777). However, the method also cannot necessarily be conclusive for a method to suppress the variation and fluctuation of mechanical properties such as boiling water shrinkage percentage and refraction index of film winded in a film roll.

As a result of committed research on production techniques to produce a biaxially stretched film roll with high homogeneity, the present inventors invented a polyamide based resin film roll with high homogeneity in film thickness, boiling water shrinkage percentage and refraction index, and other physical properties and capable of bag forming processing smoothly with good yield ratio free of wrinkles between films efficiently at lamination (Japanese Unexamined Patent Publication 2004-262922).

Disclosure of the Invention

Problems to be Solved by the Invention

According to the polyamide based resin film roll with high homogeneity in film thickness, boiling water shrinkage percentage, and refraction index and other physical properties, the workability at the time of laminating can be improved without impairing satisfactory toughness and pinhole resistance of polyamide-based resin film and without generating any S-shaped curl phenomenon. However, even in the event of the polyamide-based resin film roll with highly uniform physical properties as described above, there are cases in which satisfactory lubricity is not developed on rolls of a laminating machine when lamination is performed under high humidity in the summertime, etc., and it was identified that satisfactory processing characteristics are not always obtained.

In addition, the film composed of only polyamide based resin has limitations in the pinhole resistance, and is not always said it is suited for packaging applications of food containing a large volume of water such as liquid soup, etc. As a means to improve the pinhole resistance of polyamide based resin film, a method of filling polyamide based resin, which is the film material, with elastomer is known, but in such mixed resin film roll, satisfactory processing capability is unable to be obtained at the lamination processing only by reducing variations of physical properties such as film thickness, boiling water shrinkage percentage, refraction index, and variations are generated in the pinhole resistance in each of laminated bags with one side opened and three edges sealed.

The present invention has been achieved as a result of committed research and development on production technique to increase the lubricity of the polyamide based mixed laminated film under high humidity and to be free of variations as well as production technique to produce a biaxially stretched film roll with high homogeneity formed by mixed resin of polyamide based resin and elastomer. Then, the object is to solve the problems of conventional polyamide based resin film roll capable of use in the packaging application requiring the extremely high pinhole resistance, capable of bag forming processing smoothly by lamination with almost no troubles even under high humidity in the summertime, etc., and to obtain a package free from S-shaped curl efficiently. Another object is to provide a biaxially oriented polyamide based mixed resin film roll capable of obtaining a processed goods with high yield ratio in a post treatment like bag forming processing. In addition, another object is to provide a production method which can efficiently produce such a biaxially oriented polyamide based mixed resin film roll.

Means to Solve the Problems

The present inventions, the constituent of the invention described in claim 1 is a polyamide based mixed resin laminated film roll formed by winding up of the polyamide based mixed resin laminated film formed by laminating multiple polyamide based resin sheets composed of a mixed resin consisting of polyamide based resin and thermoplastic elastomer in a width of 0.2 m or more to 3.0 m or less, and a length of 300 m or more to 30000 m or less, wherein when the polyamide based mixed resin laminated film roll has a first sample cutout portion set up within 2 m from the winding end of film; and a final cutout portion set up within 2 m from the winding start of film, as well as has a sample cutout portion set up in approximately every 100 m from the first sample cutout portion, the polyamide based mixed resin laminated film roll satisfies the following requirements (1) and (2):

(1) When the content of thermoplastic elastomer composition is measured and the average content rate which is the average value of these content rates is calculated, the degree of variability of the content of thermoplastic elastomer constituent of all the samples is within the ±10% range with respect to the average content rate.

(2) the degree of variability of thickness throughout the full length in the longitudinal direction of a wound-up roll is within the range of ±2% to ±10% with respect to the average thickness.

The constituent of the invention described in claim 2 is a polyamide based mixed resin laminated film roll formed by winding up of the polyamide based mixed resin laminated film formed by laminating multiple polyamide based resin sheets composed of a mixed resin consisting of polyamide based resin and thermoplastic elastomer in a width of 0.2 m or more to 3.0 m or less, and a length of 300 m or more to 30000 m or less, wherein when the polyamide based mixed resin laminated film roll has a first sample cutout portion set up within 2 m from the winding end of film; and a final cutout portion set up within 2 m from the winding start of film, as well as has a sample cutout portion set up in approximately every 100 m from the first sample cutout portion, the polyamide based mixed resin laminated film roll satisfies the following requirements (3):

(3) When the elastic modulus in tension in the film wound-up direction is measured for each sample cut out from each of the cutout portions, the average elastic modulus in tension which is the average value of elastic moduli of the samples, is 1.30 GPa or more and less than 2.50 GPa and at the same time the degrees of variability of all samples are included in the range of ±10% with respect to the average elastic modulus in tension.

The constituent of the invention described in claim 3 is a polyamide based mixed resin laminated film roll formed by winding up of the polyamide based mixed resin laminated film formed by laminating multiple polyamide based resin sheets composed of a mixed resin consisting of polyamide based resin and thermoplastic elastomer in a width of 0.2 m or more to 3.0 m or less, and a length of 300 m or more to 30000 m or less, wherein when the polyamide based mixed resin laminated film roll has a first sample cutout portion set up within 2 m from the winding end of film; and a final cutout portion set up within 2 m from the winding start of film, as well as has a sample cutout portion set up in approximately every 100 m from the first sample cutout portion, the polyamide based mixed resin laminated film roll satisfies the following requirements (4):

(4) The number of pinholes when a 3000-cycle bending test is continuously carried out on each sample cut out from each cut out portion at the speed of 40 cycles per minute using a Gelvo type Flex-Cracking Tester is 10 or less in all cases.

The constituent of the invention described in claim 4 is, in the invention described in any of claims 1 through 3, the polyamide based mixed resin laminated film roll wherein when a maximum boiling water shrinkage percentage of each sample cut out from each of the cutout portions is measured, the maximum boiling water shrinkage percentage being the maximum value of boiling water shrinkage percentages in all directions, an average boiling water shrinkage percentage, which is an average value, of the maximum boiling water shrinkage percentages is 2% to 6%, and a degree of variability in the maximum boiling water shrinkage percentages of all samples is within a range of ±2% to ±10% relative to the average boiling water shrinkage percentage.

The constituent of the invention described in claim 5 is, in the invention described in any of claims 1 through 3, the polyamide based mixed resin laminated film roll wherein when a directional difference of boiling water shrinkage percentage, which is the absolute value of the difference between a boiling water shrinkage percentage in the direction of +45° to the longitudinal direction and a boiling water shrinkage percentage in the direction of −45° to the longitudinal direction, of each sample cut out from each of the cutout portions is measured, an average directional difference of boiling water shrinkage percentage which is the average of the directional differences of boiling water shrinkage percentage is 2.0% or less, and a degree of variability in the directional differences of boiling water shrinkage percentage of all samples is within a range of ±2% to ±30% relative to the average directional difference of boiling water shrinkage percentage.

The constituent of the invention described in claim 6 is, in the invention described in any of claims 1 through 3, the roll wherein each sample cut out from each cutout portion satisfies the following requirements (5) and (6):

(5) When each sample cut out from each cut out portion is measured for the three-dimensional surface roughness in the winding-up direction, the average surface roughness which is the average value of three-dimensional surface roughness of all the samples is within a range of 0.01 to 0.06 μm, and a degree of variability of three-dimensional surface roughness of all the samples is within a range of ±5% to ±20% relative to the average surface roughness.

(6) When each sample cut out from each cut out portion is measured for the haze, the average haze which is the average value of hazes of all the samples is within a range of 1.0 to 4.0 and at the same time a degree of variability of haze of all the samples is within a range of ±2% to ±15% relative to the average haze.

The constituent of the invention described in claim 7 is, in the invention described in any of claims 1 through 3, the roll wherein when a coefficient of dynamic friction is measured under the atmosphere of 23° C. and 80% RH for each sample cut out from each cutout portion, the average coefficient of dynamic friction which is the average value of coefficients of dynamic friction of the samples is within a range of 0.3 to 0.8 and at the same time a degree of variability of the coefficient of dynamic friction of all the samples is within a range of ±5% to ±30% relative to the average coefficient of dynamic friction.

The constituent of the invention described in claim 8 is, in the invention described in any of claims 1 through 3, the roll wherein when the content of inorganic particles is measured for each sample cut out from each cutout portion, the average content which is the average value of the content of inorganic particles is within a range of 0.01 to 0.5% by weight and at the same time a degree of variability of the content of inorganic particles of all the samples is within a range of ±2% to ±10% relative to the average content of inorganic particles.

The constituent of the invention described in claim 9 is, in the invention described in any of claims 1 through 3, the roll wherein when refraction index in the thick direction of each sample cut out from each of the cutout portions is measured, an average refraction index which is the average value of the refraction indexes is 1.500 or more, 1.520 or less, and a degree of variability in the refraction indexes of all samples is within a range of ±2% relative to the average refraction index.

The constituent of the invention described in claim 10 is, in the invention described in any of claims 1 through 3, the polyamide based mixed resin laminated film roll wherein the polyamide based mixed resin laminated film wound up has the average particle size of inorganic particles in the ⅓ part of the total thickness close to the top surface of the film and the bottom surface of the film are made smaller than the average particle size of inorganic particles in the rest part.

The constituent of the invention described in claim 11 is, in the invention described in any of claims 1 through 3, the roll wherein the major component of polyamide composing The polyamide based mixed resin laminated film is nylon 6.

The constituent of the invention described in claim 12 is, in the invention described in any of claims 1 through 3, The polyamide based mixed resin laminated film roll wherein The polyamide based mixed resin laminated film formed by a mixture of two or more different types of polyamide based resin.

The constituent of the invention described in claim 13 is, in the invention described in any of claims 1 through 3, the roll wherein the polyamide based resin film wound up is laminated with a polyolefin based laminated resin film.

The constituent of the invention described in claim 14 is, in the invention described in any of claims 1 through 3, the roll wherein a polyamide based mixed resin laminated film formed by biaxially stretching an unoriented sheet-like material obtained by extruding melted polyamide based resin from a T die and being brought in contact with a metal roll to cool is wound up.

The constituent of the invention described in claim 15 is, in the invention described in any of claims 1 through 3, the roll which is a polyamide based mixed resin laminated film wound up being stretched by a tenter stretching method.

The constituent of the invention described in claim 16 is, in the invention described in any of claims 1 through 3, the roll which is a polyamide based mixed resin laminated film wound up being sequentially biaxially stretched.

The constituent of the invention described in claim 17 is, in the invention described in any of claims 1 through 3, the roll wherein a polyamide based mixed resin laminated film biaxially stretched in the longitudinal direction and in the transverse direction is wound up.

The constituent of the invention described in claim 18 is, in the invention described in any of claims 1 through 3, the roll which is a polyamide based mixed resin laminated film wound up wherein an substantially unoriented sheet-like substance of polyamide based resin is stretched in at least two stages in the longitudinal direction to be threefold or more at a higher temperature than the glass transition temperature of the polyamide based resin +20° C., then stretched in the transverse direction to be threefold or more.

The constituent of the invention described in claim 19 is, in the invention described in any of claims 1 through 3, the roll which is a polyamide mixed based laminated resin film wound up being thermally fixed after a final stretching treatment.

The constituent of the invention described in claim 20 is, in the invention described in any of claims 1 through 3, the roll which is a polyamide based mixed resin laminated film wound up is treated with relaxing after a thermal fixation.

The constituent of the invention described in claim 21 is, in the invention described in any of claims 1 through 3, the roll wherein at least one kind selected from lubricant, anti-blocking agent, thermal stabilizer, antioxidant, antistatic agent, light resistant agent and impact modifier is added into the polyamide based mixed resin laminated film wound up.

The constituent of the invention described in claim 22 is, in the invention described in any of claims 1 through 3, the roll wherein inorganic particle is added into the polyamide based mixed resin laminated film wound up.

The constituent of the invention described in claim 23 is, in the invention described in claim 22, the roll wherein the inorganic particle is a silica particle of 0.5-5.0 μm in an average diameter.

The constituent of the invention described in claim 24 is, in the invention described in any of claims 1 through 3, the roll wherein a higher fatty acid is added into the polyamide based mixed resin laminated film wound up.

The constituent of the invention described in claim 25 is a production method of the polyamide based mixed resin laminated film roll described in claim 1, includes a film forming step of forming unstretched polyamide based mixed resin laminated sheet by melt-extruding mixed resin composed of polyamide based resin and thermoplastic elastomer from multiple extruders by co-extrusion method; and a biaxially stretching step of the unstretched polyamide based mixed resin laminated sheet obtained in the film forming process in the longitudinal direction and in the transverse direction, wherein the production method satisfies the following requirements from (a) to (f):

(a) The film forming step includes melt extrusion after polyamide based resin chips and thermoplastic elastomer chips are mixed, wherein mixing of the polyamide resin chips and thermoplastic elastomer chips is performed with a sublimation segregation inhibitor added;

(b) The film forming step is to mix polyamide based resin chips and thermoplastic elastomer chips, and to laminate polyamide based mixed resin sheets with inorganic particles added 0.1 to 2.0% by weight on the uppermost superficial layer;

(c) The biaxially stretching process is to stretch the unstretched polyamide based mixed resin laminated sheet in the transverse direction after stretching in the longitudinally direction in two stages, and the stretching ratio of the first stage in two-stage stretching in the longitudinal direction is set to be higher than the stretching ratio of the second stage;

(d) The film forming step is to melt-extrude from each extruder after mixing polyamide based resin chips and thermoplastic elastomer chips, wherein the shape of each chip used is elliptic cylinder having elliptic cross section with a major axis and a minor axis, and the thermoplastic elastomer chips are adjusted to those having average major axis, average minor axis and average chip length to be within a range of ±25% relative to the average major axis, average minor axis and average chip length of the polyamide based resin chips;

(e) The film forming step includes a melt extrusion step using multiple extruders equipped with a funnel-shape hopper as a material chip feeder unit, wherein the inclination angles of the funnel-shape hoppers are all adjusted to 65 degrees or more and the moisture content of polyamide based resin chips before being fed into the funnel-shape hoppers is adjusted to be 800 ppm or more and 1000 ppm or less, and at the same time, the temperature of polyamide based resin chips before being fed into the funnel-shape hoppers is adjusted to 80° C. or higher; and (f) The film forming step includes a step for cooling the polyamide based mixed resin laminated sheet melt-extruded from the multiple extruders by co-extrusion method and by winding up around a cooling roll, wherein in the cooling step, the portion of the polyamide based mixed resin laminated sheet to which the cooling roll surface comes into contact is attracted in a direction opposite to the winding-up direction by a suction device throughout the full width of the polyamide based mixed resin laminated sheet.

The constituent of the invention described in claim 26 is, in the invention described in claim 25, a process wherein the film forming step is to laminate a skin layer added with 0.05 to 2.0% by weight of inorganic particles on a core layer by utilizing high-concentration material chips.

The constituent of the invention described in claim 27 is, in the invention described in claim 25, a process wherein the high-concentration material chips used in the film forming process are polyamide based resin chips with inorganic particles added by 5% by weight or more and less than 20% by weight.

The constituent of the invention described in claim 28 is, in the invention described in claim 25, a process wherein the inorganic particles added to the polyamide based resin sheet to be laminated on the uppermost layer in the film forming step has the pore volume of 0.5 to 2.0 mL/g and the average grain size of 1.0 to 5.0 μm.

The constituent of the invention described in claim 29 is, in the invention described in claim 25, a process further including a preheating process executed before the longitudinal stretching process and a heat-treatment process executed after the longitudinal stretching process, wherein a variation width of surface temperature of film at any point of the longitudinal stretching process, the preheating process and the heat-treatment process is adjusted throughout the full length of the film within a range of ±1° C. to the average temperature.

Effect of the Invention

According to the polyamide based mixed resin laminated film roll of the present invention, even when bag forming processing of each of laminated bags with one side opened and three edges sealed for packaging liquid soup, etc. where a high degree of pinhole resistance is required is conducted under high humidity of the summertime, etc., it can be conducted smoothly by lamination with almost no troubles, and it becomes possible to obtain packages free from S-shaped curl efficiently. Also, it becomes possible to obtain processed goods with high yield ratio in a post-processing such as bag forming processing. In addition, in use of the polyamide based mixed resin laminated film roll of the present invention, a bag for food packaging after bag forming processing by lamination provides remarkably high pinhole resistance and at the same time, variations of pinhole resistance for each bag can be reduced.

In addition, according to the producing method of polyamide based mixed resin laminated film roll of the present invention, the polyamide based mixed resin laminated film roll with remarkably high pinhole resistance as well as excellent lamination processing capabilities under high humidity can be obtained inexpensively and extremely efficiently.

BEST MODE FOR CARRYING OUT THE INVENTION

The polyamide based mixed resin laminated film roll according to the present invention must have the degree of variability of the content of thermoplastic elastomer component of all samples to be within the range of ±10% with respect to the average content rate when samples are cut out by a method later discussed, and for each of cutout samples, the content of thermoplastic elastomer component is measured and the average content rate which is the average value of these content rates is calculated (claim 1).

The cutout of sample in the present invention is first set up to be a first sample cutout portion within 2 m from the winding end of film and a final cutout portion within 2 m from the winding start of film, and a sample cutout portion is to be set up in approximately every 100 m from the first sample cutout portion. Additionally, "approximately every 100 m" means that a sample may be cut out in about 100 m±1 m.

The above-mentioned cutout of sample will be more specifically described as follows; for example, when a roll of polyamide based film is winded in a length of 498 m, a first sample (1) is cut out within 2 m from the winding end of film. Additionally, the cutout of sample is for convenience cut into a rectangle having a side along the longitudinal direction and a side perpendicular to the longitudinal direction (not to be cut out on a slant). Subsequently, a second sample (2) is cut out in a part 100 m apart toward the winding start side from the part cut out. Similarly a third sample (3) in a part 200 m apart toward the winding start side, a fourth sample (4) in a part 300 m apart toward the winding start side, and a fifth sample (5) in a part 400 m apart toward the winding start side are cut out. When samples are cut out in this way, the rest becomes shorter than 100 m, thus a sixth (final) sample (6) is cut out in any part within 2 m from winding start of film.

For each of cut out samples as described above, the content of the thermoplastic elastomer component is quantitatively analyzed and the average content rate which is the average value of these contents is calculated; in such event, the degree of variability of the content of thermoplastic elastomer component of all samples must be within the range of ±10% with respect to the average content rate. Here, a degree of variability of the thermoplastic elastomer component content of all samples means a ratio of the difference between the maximum or the minimum thermoplastic elastomer component content and the average content, whichever larger, to the average content, when the maximum and the minimum thermoplastic elastomer component contents (measured values) of all samples are determined. Additionally, the thermoplastic elastomer component content is able to be measured by a method to form a super thin piece by slicing the film perpendicular to the surface, dye the elastomer component with a specific substance, and calculate an area ratio of the dyed portion to the overall area, as described later, or is able to be measured by other methods such as infrared spectroscopic analysis or NMR spectroscopic analysis with focusing on peaks specific to elastomer.

Additionally, the polyamide based mixed resin laminated film roll according to the present invention has the degree of variability of elastomer component content of all cutout samples to be preferably in the range of within ±9% of the average content, and more preferably in the range of within ±8%, and still more preferably in the range of within ±7%.

In addition, it is preferable for the polyamide based mixed resin laminated film roll according to the present invention to have as small the degree of variability of elastomer component content of all cutout samples as possible but the lower limit of the relevant degree of variability is assumed to be about 2% with the measurement accuracy taken into account.

It is necessary for the polyamide based mixed resin laminated film roll according to the present invention to have the average elastic modulus in tension, which is the average value of elastic moduli in tension when the elastic modulus in tension is measured for each sample cut out from each cutout portion, of 1.30 GPa (1300 N/mm$^2$) or more, and less than 2.50 GPa (2500N/mm$^2$) and at the same time, the degree of variability of elastic moduli in tension of all samples adjusted within the range of ±10% with respect to the average elastic modulus in tension (claim 2). Here, a degree of variability of the elastic modulus in tension of all samples means a ratio of the difference between the maximum or the minimum elastic modulus in tension and the average elastic modulus in tension, whichever larger, to the average elastic modulus in tension, when the maximum and the minimum elastic moduli in tension of all samples are determined.

Additionally, the elastic modulus in tension of polyamide based mixed resin laminated film that composes polyamide based mixed resin laminated film roll is important to increase toughness and pinhole resistance of the film itself, and when the elastic modulus in tension is less than 1.30 GPa, toughness and pinhole resistance becomes insufficient, and on the contrary, when the elastic modulus in tension exceeds 2.50 GPa, the tear strength is degraded when the film is formed into a three-edge sealed bag, which is not preferable. The range of elastic modulus in tension which is preferable for increasing toughness, pinhole resistance, and tear strength when a three-edge sealed bag is formed is between 1.50 GPa and 2.30 GPa.

Additionally, for the polyamide based mixed resin laminated film roll according to the present invention, the degree of variability of elastic modulus in tension of all cut-out samples is preferably within the range of ±9% of the average elastic modulus in tension, and more preferably within the range of ±8%, and still more preferably within the range of ±7%.

In addition, it is preferable for the polyamide based mixed resin laminated film roll according to the present invention to have as small the degree of variability of elastic modulus in tension of all cutout samples as possible but the lower limit of the relevant degree of variability is assumed to be about ±2% with the measurement accuracy taken into account.

Furthermore, it is necessary for the polyamide based mixed resin laminated film roll according to the present invention to have the number of pinholes adjusted to be 10 pieces or less in all cases when a 3000-cycle bending test is continuously carried out on each sample cut out from each cutout portion at the speed of 40 cycles per minute using a Gelvo type Flex-Cracking Tester (claim 3).

[Measurement Method of the Pinhole Resistance]

A film laminated with polyolefin film, etc. and cut into a predetermined size (20.3 cm×27.9 cm) is conditioned throughout a predetermined time under a predetermined temperature and humidity; then, the rectangular test film is winded on to make a cylindrical shape with a predetermined length. Then, both ends of the cylindrical film are fixed to the outer circumference of a disk-shape fixed head as well as to the outer circumference of a disk-shape movable head of the Gelvo type Flex-Cracking Tester, the movable head is rotated at a predetermined angle (440°) while it is being brought closer by a predetermined length (7.6 cm) in the fixed head direction along the axes of both heads opposite in parallel, and then, is allowed to go straight ahead by a predetermined length (6.4 cm) without rotating; then, these operations are reversely performed to return the movable head to the original position. This constitutes one cycle of bend test. The bend test is continuously repeated at a predetermined speed (40 cycles per minute) by predetermined cycles (3000 cycles). Then, the number of pinholes generated at a portion of a predetermined range (497 cm$^2$) is counted, with the portions of the outer circumferences of the tested film excluded, to which the fixed head and the movable head are fixed.

For the polyamide based mixed resin laminated film roll according to the present invention, it is preferable that an average boiling water shrinkage percentage which is the average value of the maximum boiling water shrinkage percentages is adjusted to be 2% or more to 6% or less when a maximum boiling water shrinkage percentage which is the maximum value of boiling water shrinkage percentages in all directions for all samples is measured, in the case of cutting out a sample by a method described above.

Also, in the case of cutting out a sample in a method described above, when a directional difference of boiling water shrinkage percentage, which is the absolute value of the difference between a boiling water shrinkage percentage in the direction of +45° to the longitudinal direction and a boiling water shrinkage percentage in the direction of −45° to the longitudinal direction for all samples, of a polyamide based mixed resin laminated film roll of the present invention is measured an average directional difference of boiling water shrinkage percentage which is the average value of the directional differences of boiling water shrinkage percentage is adjusted to be 2.0% or less.

[Measuring Methods of Boiling Water Shrinkage Percentage (BS), Maximum Boiling Water Shrinkage Percentage (BSx), Average Boiling Water Shrinkage Percentage (BSax), Directional Difference of Boiling Water Shrinkage Percentage (BSd) and Average Directional Difference of Boiling Water Shrinkage Percentage (BSad)]

A film cut out from each of cutout portions of polyamide based mixed resin laminated film roll is cut out into a square, allowed to stand in an atmosphere of 23° C. and 65% RH for 2 hours and more. A circle centered on this sample (about 20 cm in diameter) is drawn, a longitudinal direction (direction of film drawn out) is set to be 0°, liner lines passing to the center of circle are clockwise drawn at intervals of 15° in the direction of 0 to 165°, diameter in each direction is measured as the length before treatment. Then, after the sample cut out is thermally treated in boiling water for 30 minutes, it is brought back and water attached on its surface is wiped out, dried in air, allowed to stand in an atmosphere of 23° C. and 65% RH for 2 hours or more, the length of linear line drawn to each diametrical direction is measured as the length after treatment as described above. Then, according to the following formulas 1 to 5, the following values are measured, which are, a BS (boiling water shrinkage percentage), BSx (maximum boiling water shrinkage percentage), BSax (average boiling water shrinkage percentage), BSd (directional difference of boiling water shrinkage percentage) and BSad (average directional difference of boiling water shrinkage percentage).

$BS=[(\text{length before treatment}-\text{length after treatment})/\text{length before treatment}]\times 100(\%)$   1

$BSx=$ maximum shrinkage percentage (%) of values measured in 0 to 165° directions at intervals of 15°   2

$BSax=$ summation of $BSx$'s of all samples/number of samples   3

$BSd=|(BS \text{ in } 45° \text{ direction})-(BS \text{ in } 135° \text{ direction})|$   4

$BSad=$ summation of $BSd$'s of all samples/number of samples   5

Additionally, BSx value of film composing a polyamide based mixed resin laminated film roll is important from the points for enhancing toughness and pinhole resistance of film itself as well as for securing the thermal resistance when the film is formed into a bag shape and is allowed to undergo hot-water treatment (it is called laminate strength or heat-resistant laminate strength). When BSx value is less than 2%, toughness and pinhole resistance become insufficient, whereas when more than 6%, lamination becomes poor, heat-resistant laminate strength in hot-water treatment becomes insufficient, which is not preferable. Preferable range of BSx is 3.5-5.0% for enhancing toughness, pinhole resistance, lamination property and heat-resistant laminate strength.

Also, BSd value of film composing a polyamide based mixed resin laminated film roll greatly affects a curl phenomenon occurring in boiling water treatment. That is, the larger the BSd, the more easily a bag is warped into a notable curl. However, when BSd is suppressed to 2.0% or less, preferably 1.5% or less more preferably 1.2% or less, warpage of bag in boiling water treatment can be remarkably suppressed, which can prevent the occurrence of S-shaped curl phenomenon.

Also, for a polyamide based mixed resin laminated film roll of the present invention, it is preferable that a degree of variability in the maximum boiling water shrinkage percentage (BSx) of all samples cut out is adjusted within ±2% to ±10% (±2% or more and ±10% or less) relative to the average boiling water shrinkage percentage (BSa). Here, a degree of variability in the maximum boiling water shrinkage percentages (BSx) of all samples means, when the maximum and the minimum in the maximum boiling water shrinkage percentages (BSx) of all samples are obtained, from which a larger value of the difference between either the maximum or the minimum and the average boiling water shrinkage is obtained, a ratio of which relative to the average boiling water shrinkage percentage.

Namely, in a polyamide based mixed resin laminated film roll of the present invention, when boiling water shrinkage percentage of samples (1) through (6) is denoted as Xn (n=1 to 6), both the difference between Xmax, the maximum value of Xn and average boiling water shrinkage percentage (BSax) and the difference between Xmin, the minimum value and average boiling water shrinkage percentage (BSax) are preferable to be within ±10%. In other words, |BSax−Xn| (additionally | | indicates absolute value) are all preferable to be 10% or less.

Additionally, in a polyamide based mixed resin laminated film roll of the present invention, a degree of variability in the maximum boiling water shrinkage percentages (BSx) of all samples cut out is preferably within ±9% relative to the average boiling water shrinkage percentage (BSa), more preferably within ±8%, and especially preferably within ±7%.

In addition, in a polyamide based mixed resin laminated film roll of the present invention, a lower degree of variability in the maximum boiling water shrinkage percentages (BSx) of all samples cut out is preferable, but we are considering that the lower limit of the degree of variability is limited to about 2% from the consideration of precision in the measurement.

Also, for a polyamide based mixed resin laminated film roll, a degree of variability in the directional differences of boiling water shrinkage percentages (BSd) of all samples cut out is preferable to be adjusted within ±2% to ±30% (±2% or more and ±30% or less) relative to the average directional difference of boiling water shrinkage percentage (BSad). Here, a degree of variability in the directional differences of boiling water shrinkage percentages (BSd) of all samples means, when the maximum and the minimum in the directional differences of boiling water shrinkage percentages (BSd) of all samples are obtained, from which a larger value of the difference between either the maximum or the minimum and the average directional difference of boiling water shrinkage is obtained, a ratio of which to the average boiling water shrinkage percentage.

Namely, in a polyamide based mixed resin laminated film roll, when directional difference of boiling water shrinkage percentage of samples (1) through (6) is denoted as Yn (n=1 to 6), both the difference between Ymax, the maximum value of Yn and average directional difference of boiling water shrinkage percentage (BSad) and the difference between Ymin, the minimum value and average directional difference of boiling water shrinkage percentage (BSad) are preferable to be within ±30%, in other words, |BSad−Yn| (additionally | | indicates absolute value) are all preferable to be 30% or less.

Additionally, in a polyamide based mixed resin laminated film roll of the present invention, a degree of variability in the directional differences of boiling water shrinkage percentage (BSd) of all samples cut out is preferably within ±20% relative to the average directional difference of boiling water shrinkage percentage (BSad), more preferably within ±15%, further preferably within ±10%, and especially preferably within ±8%.

In addition, in a polyamide based mixed resin laminated film roll of the present invention, a lower degree of variability in the directional differences of boiling water shrinkage percentage (BSd) of all samples cut out is preferable, but we are considering that the lower limit of the degree of variability is limited to about 2% from the consideration of precision in the measurement.

The polyamide based mixed resin laminated film roll of the present invention is preferable to have the average surface roughness (SRaa), which is the average value of the three dimensional surface roughness (SRa) of all the cutout samples, set in a range of 0.01 to 0.06 μm, and it is preferable that it is included in a range of 0.02 to 0.05 μm (Additionally, one example of the measurement method of three-dimensional surface roughness will be explained in an Example). When the average surface roughness is below 0.01 mm, satisfactory lubricity under high humidity is unable to be obtained, which is not preferable, and on the contrary, when the average surface roughness exceeds 0.06 μm, adhesion with films such as polyolefin is degraded at the time of lamination, which is not preferable.

In addition, the polyamide based mixed resin laminated film roll of the present invention is preferable to have the degree of variability of three-dimensional surface roughness (SRa) of all the cutout samples adjusted to be in the range of ±5% to ±20% (±5% or more and ±20% or less) of the average surface roughness (SRaa). The degree of variability of three-dimensional surface roughness (SRa) of all the samples referred to here means a ratio of the difference between the maximum or the minimum differences of three-dimensional surface roughness and the average difference of three-dimensional surface roughness, whichever larger, to the average difference of three-dimensional surface roughness, when the maximum and the minimum of three-dimensional surface roughness (SRa) of all samples are found.

That is, in a polyamide mixed based laminated resin film roll of the present invention, when three-dimensional surface roughness of samples (1) through (6) is denoted as SRn (n=1 to 6), both the difference between SRmax, the maximum value of SRn and average surface roughness (SRaa), and the difference between SRmin, the minimum value and average surface roughness (SRaa) are preferable to be within ±20%, in other words, all |SRaa−SRn| (Additionally, | | indicates the absolute value) are preferable be 20% or less.

In addition, in a polyamide based mixed resin laminated film roll of the present invention, a degree of variability in the three-dimensional surface roughness (SRa) of all samples cut out is preferably within ±15% relative to the average surface roughness (SRaa), more preferably within ±10%, and further preferably within ±8%. In addition, in a polyamide based mixed resin laminated film roll of the present invention, a lower degree of variability in the three-dimensional surface roughness (SRa) of all samples cut out is preferable, but it is considered that the lower limit of the degree of variability is limited to about 5% with the measurement accuracy taken into account.

Also, in a polyamide based mixed resin laminated film roll of the present invention, the average haze which is the average value of hazes of all the cutout samples must be within the range of 1.0 to 4.0, and more preferably within the range of 1.5 to 3.0. When the average haze exceeds 4.0, the appearance of bags formed when bag-forming processing is provided become degraded, which is not preferable. Additionally, the average haze is smaller, which is more preferable, but it is considered that the lower limit of the average haze is limited to about 1.0% with the measurement accuracy taken into account.

In addition, the polyamide based mixed resin laminated film roll of the present invention is preferable to have the degree of variability of haze (SRa) of all the cutout samples adjusted to be within the range of ±2% to ±15% (±2% or more and ±15% or less) of the average haze. The degree of variability of haze of all the samples referred to here means a ratio of the difference between the maximum or the minimum differences of haze and the difference of average haze, whichever larger, to the difference of average haze, when the maximum and the minimum of average haze of all samples are found.

That is, in a polyamide based mixed resin laminated film roll of the present invention, when haze of samples (1) through (6) is denoted as Hn (n=1 to 6), both the difference between Hmax, the maximum value of Hn and average haze (Han), and the difference between Hmin, the minimum value and average haze (Han) are preferable to be within ±15%, in other words, all |Han−Hn| (Additionally, | | indicates the absolute value) are preferable be 15% or less.

In addition, in a polyamide based mixed resin laminated film roll of the present invention, a degree of variability of a haze of all samples cut out is preferably within ±10% relative to the average haze, more preferably within ±8%. In addition, in a polyamide based mixed resin laminated film roll of the present invention, a lower degree of variability in the haze of all samples cut out is preferable, but it is considered that the lower limit of the degree of variability is limited to about 2% with the measurement accuracy taken into account.

Also, in a polyamide based mixed resin laminated film roll of the present invention, a degree of variability in thickness over the entire length in the longitudinal direction must be adjusted within a range of ±2% to ±10% (±2% or more and ±10% or less) relative to the average thickness. Here, a degree of variability in thickness over the entire length in the longitudinal direction means a ratio of the difference between the maximum or the minimum thickness and the average thickness, whichever larger, to the average thickness, when the maximum and the minimum in the thickness over the entire length in the longitudinal direction of all samples are found.

Namely, in a polyamide based mixed resin laminated film roll of the present invention, both the difference between Tmax, the maximum value in thickness over the entire length in the longitudinal direction and the average thickness (Ta, average thickness over the entire length in the longitudinal direction) and the difference between Tmin, the minimum value and the average thickness (Ta) are required to be within ±10%.

Additionally, in a polyamide based mixed resin laminated film roll of the present invention, a degree of variability in thickness over the entire length in the longitudinal direction is preferably within a range of ±8% relative to the average thickness (Ta), more preferably within a range of ±6%.

In addition, in a polyamide based mixed resin laminated film roll of the present invention, a lower degree of variability in thickness over the entire length in the longitudinal direction is preferable, but it is considered that the lower limit of the degree of variability is limited to about 2% in view of the performance of film forming apparatus.

On the other hand, in the polyamide based mixed resin laminated film roll of the present invention, the average coefficient of dynamic friction ($\mu$da), which is the average value of coefficient of dynamic friction ($\mu$d) at 23° C.×80% RH of all the cutout samples is preferably between a range of 0.3 and 0.8, and more preferably between a range of 0.4 and 0.6. When the average coefficient of dynamic friction at 23° C.×80% RH is below 0.3, film displacement is generated on rolls at the time of bag-forming processing and the processing capabilities are degraded, which is not preferable, and on the contrary, when the average coefficient of dynamic friction exceeds 0.8, satisfactory lubricity under high humidity is unable to be obtained, which is not preferable, either.

Also, in a polyamide based mixed resin laminated film roll of the present invention, a degree of variability in the coefficient of dynamic friction ($\mu$d) of all the cutout samples is adjusted, within a range of ±5% to ±30% (±5% or more and ±30% or less) relative to the average coefficient of dynamic friction, which is preferable. Here, a degree of variability in coefficient of dynamic friction ($\mu$d) of all the samples means a ratio of the difference between the maximum or the minimum coefficient of dynamic friction and the average coefficient of dynamic friction, whichever larger, to the average coefficient of dynamic friction, when the maximum and the minimum in the coefficient of dynamic friction of all samples are found.

That is, in a polyamide based mixed resin laminated film roll of the present invention, when the coefficient of dynamic friction of the above-mentioned samples (1) through (6) is denoted as $\mu$n (n=1 to 6), both the difference between the maximum value μmax of μn and the average coefficient of dynamic friction (μda) and the difference between the minimum value μmin and average coefficient of dynamic friction are preferably within ±30%, in other words, |μda−μn,| (Additionally, | | indicates the absolute value) are preferably 30% or less.

Additionally, in a polyamide based mixed resin laminated film roll of the present invention, a degree of variability in coefficient of dynamic friction (μd) of all the cutout samples is preferably within ±20% relative to the average coefficient of dynamic friction, more preferably within the range of ±15%, and especially preferably within the range of ±10%. In addition, in a polyamide based mixed resin laminated film roll of the present invention, a lower degree of variability in coefficient of dynamic friction (μd) of the all cutout samples is preferable, but it is considered that the lower limit of the degree of variability is limited to about 5% with measurement accuracy taken into account.

On the other hand, in the polyamide based mixed resin laminated film roll of the present invention, it is preferable that the average inorganic particle content, which is the average value of the inorganic particle content of all the cutout samples, are set in a range of 0.01 to 0.05% by weight, and it is not preferable that it is included in a range of 0.05 to 0.3% by weight (Additionally, one example of the measurement method of inorganic particle content will be explained in an Example) When the average inorganic particle content is below 0.01% by weight, satisfactory lubricity under high humidity is unable to be obtained, which is not preferable, and on the contrary, when the average inorganic particle content exceeds 0.5% by weight, it becomes difficult to recover and recycle polyamide resin deleted in the producing process, which is not preferable.

In addition, the polyamide based mixed resin laminated film roll of the present invention must have the degree of variability of inorganic particle content of all the cutout samples adjusted to be in the range of ±2% to ±10% (±2% or more and ±10% or less) of the average content, which is preferable. The degree of variability of inorganic particle content of all the samples referred to here means a ratio of the difference between the maximum or the minimum differences of inorganic particle content and the average difference of inorganic particle content, which ever larger, to the average difference of inorganic particle content, when the maximum and the minimum of inorganic particle content of all samples are found.

That is, in a polyamide based mixed resin laminated film roll of the present invention, it is preferable that when inorganic particle content of samples (1) through (6) is denoted as Cn (n=1 to 6), both the difference between Cmax, the maximum value of Cn and average inorganic particle content (Ca), and the difference between Cmin, the minimum value and average inorganic particle content (Ca) must be within ±10%, in other words, it is preferable that all |Ca−Cn| (Additionally, | | indicates the absolute value) must be 10% or less.

In addition, in a polyamide based mixed resin laminated film roll of the present invention, a degree of variability in the inorganic particle content of all samples cut out is preferably within a range of ±8% relative to the average inorganic particle content, more preferably within a range of ±6%. In addition, in a polyamide based mixed resin laminated film roll of the present invention, a lower degree of variability in the inorganic particle content of all samples cut out is preferable, but it is considered that the lower limit of the degree of variability is limited to about 2% with the measurement accuracy taken into account.

In addition, in a polyamide based mixed resin laminated film roll, in the case where a sample is cut out in the foregoing method, when refraction index (Nz) in the thickness direction of all samples are determined, an average refraction index (Nza) which is the average of the refractive indexes is preferably adjusted to be 1.500 or more, 1.520 or less. Additionally, the average refraction index is calculated by the following formula 6.

$$Nza = \text{summation of } Nz\text{'s of all samples/number of samples} \quad\quad 6$$

Additionally, Nz value of biaxially oriented film composing polyamide based mixed laminated film roll greatly affects film grade such as laminate strength and thickness irregularity. Thus, the requirement of average refraction index of 1.500 or more and 1.520 or less is an essential requirement in use of biaxially oriented film laminated with a polyolefin based resin film. When Nz is less than 1.500, laminate strength with a polyolefin based resin film etc. becomes insufficient, which tends to cause peeling between the film and laminated substrate in boiling water treatment after bag forming. Moreover, the Nz is lowered sequentially in a process of biaxial stretching of unstreched film (sheet). In other words, Nz is thought to be an index of stretching, larger Nz indicates insufficient stretching, thus a film with Nz of more than 1.520 remarkably displays thickness irregularity due to insufficient stretching, giving an unsatisfactory film grade. Particularly preferable range of Nz is in a range of 1.507 to 1.516 from the considerations of both laminate strength and film grade.

Also, in a polyamide based mixed resin laminated film roll, a degree of variability in the refraction index (Nz) of all samples cut out is preferably adjusted within ±2% relative to the average of refraction indexes (hereinafter called an average refraction index). Here, a degree of variability in the refraction index (Nz) of all samples means, when the maximum and the minimum in the refraction index (Nz) of all samples are obtained, from which a larger value of the difference between either the maximum or the minimum and the average refraction index is obtained, a ratio of which to the average refraction.

Namely, in a polyamide based mixed resin laminated film roll, when refraction index of samples (1) through (6) is denoted as Nz1 to Nz6, both the difference between Nzmax, the maximum value of Nz1 to Nz6 and the average refraction index, and the difference between Nzmin, the minimum value of Nz1 to Nz6 and the average refraction index are preferably within ±2%, in other words, all of |average refraction index−Nz1| to |average refraction index−Nz6| are preferably 2% or less. Also, in a polyamide based laminated film roll of the present invention, a degree of variability in the refraction index (Nz) of all samples cut out is more preferably within ±1% relative to the average refraction index.

In addition, in a polyamide based mixed resin laminated film roll, a lower degree of variability in the refraction index (Nz) of all samples cut out is preferable, but we are considering that the lower limit of the degree of variability is limited to about 0.1% from the considerations of precision in the measurement and precision of machine.

As described above, by adjusting the physical properties of elastic modulus in tension, etc. of thermoplastic elastomer in one polyamide based mixed resin laminated film roll to a value within a predetermined range as well as by reducing variations of the thermoplastic elastomer content rate, elastic modulus and other physical properties, it becomes possible to prevent appearance deterioration in bag forming processing and lamination processing, and the film can be processed smoothly with good yield ratio even under high humidity, and the pinhole resistance of each bag after bag forming processing becomes remarkably high and free of variations.

As a polyamide resin used in the present invention, for example, there can be listed nylon 6 of ε-caprolactam as a major raw material. Also, as other polyamide resins, there can be listed a polyamide resin obtained by polycondensation of lactam with three-membered ring or more, ω-amino acid, dicarboxylic acid and diamine. Specifically, lactams include enantlactam, capryllactam, lauryllactam other than ε-caprolactam above-mentioned; ω-amino acids include 6-aminocaproic acid, 7-aminoheptanoic acid, 9-aminononanoic and 11-aminoundecanoic acid. Also, dicarboxylic acids include adipic acid, glutaric acid, pimelic acid, suberic acid, azelaic acid, sebacic acid, undecanedione acid, dodecadione acid, hexadecadione acid, eicosandione acid, eicosadienedione acid, 2,2,4-trimethyladipic acid, terephtahlic acid, isophthalic acid, 2,6-naphtahalene dicarboxylic acid, and xylylenedicarboxylic acid. Further, diamines include ethylenediamine, trimethylenediamine, tetramethylenediamine, hexamethylenediamine, pentamethylenediamine, undecamethylenediamine, 2,2,4 (or, 2,4,4)-trimethylhexamethylenediamine, cyclohexanediamine, bis-(4,4'-aminocyclohexyl)methane, and methaxylylenediamine. Polymers obtained by polycondensation of these chemicals and copolymers thereof, for example, nylons 6, 7, 11, 12, 6.6, 6.9, 6.11, 6.12, 6T, 6I, MXD6 (methaxylyleneadipamide 6), 6/6.6, 6/12, 6/6T, 6/6I, 6/MXD6 can be used. In addition, in the case of producing polyamide based mixed resin laminated film roll of the present invention, the above polyamide resin can be used alone or in a mixture of 2 kinds or more thereof.

Additionally, of the above polyamide based resins, particularly preferable resin in the present invention has relative viscosity in a range of 2.0 to 3.5. The relative viscosity of polyamide based resin affects toughness of biaxially stretched film obtained and stretching property. That is, when relative viscosity is less than 2.0, impact strength becomes somewhat insufficient, whereas when relative viscosity is more than 3.5, sequentially biaxially stretching property tends to be bad because of increase in stretching stress. Additionally, the relative viscosity in the present invention means a value that a solution of 0.5 g of polymer dissolved in 50 ml of 97.5% sulfuric acid is measured at 25° C.

For thermoplastic elastomer used in the present invention, for example, polyamide based elastomers of block or random copolymers, etc. of polyamide based resin such as nylon 6, nylon 12, and PTMG (polytetramethylene glycol) or PEG (polyethylene glycol), ethylene-methacrylic acidcopolymer, copolymer of ethylene and butane, copolymer of styrene and butadiene, and other polyolefin based elastomers, ethylene based ionomers and other olefin based resin ionomers, can be suitably used.

In addition, the amount of thermoplastic elastomer to be added to polyamide based resin is not particularly limited, but the lower limit of addition amount is preferably 1% by weight or more, and more preferably 2% by weight or more, and still more preferably 3% by weight or more. On the other hand, the upper limit of addition amount is preferably 15% by weight or less, and more preferably 10% by weight or less, and more preferably 6% by weight or less. When the addition amount of thermoplastic elastomer is less than 1% by weight, satisfactory pinhole resistance is unable to be obtained, which is not preferable, and on the contrary, when the addition amount of thermoplastic elastomer exceeds 15% by weight, toughness of film is lost, which is not preferable.

The polyamide based mixed resin laminated film roll of the present invention is produced as follows: an unstretched film (unstretched laminated film) obtained by melt-extrusion of polyamide resin chips and thermoplastic elastomer chips, which are raw material, is stretched biaxially in the longitudinal direction (length direction) and transverse direction (width direction) and winded up into a roll shape.

The polyamide based mixed laminated film must have a configuration of A/B (two-types two-layers) or A/B/A (two-types three-layers) or A/B/C (three-types three-layers). From the viewpoint of curl, the A/B/A configuration which is symmetrical layer configuration is preferable. Additionally, in the following description, of each layer which composes the laminated film, the layer at the center part which is not located on the outermost side (that is, B-layer in the case of A/B/A or A/B/C layer configuration) and a thick layer in the case of two-types two-layers configuration (that is, B-layer in the case of A/B layer configuration of thin A-layer and a thick B-layer) are called core-layers. In addition, a layer located on the outermost side (that is, A and B layers in the case of A/B layer configuration or A and C layers in the case of A/B/A or A/B/C layer configuration), and a thin layer in the case of two-types two-layers configuration (that is, A layer in the case of A/B layer configuration of thin A-layer and thick B-layer) are called skin layers.

The thickness ratio of each layer of the polyamide based mixed resin laminated film is preferably between 5% and 50% for A-layer or A-layer and C-layer, and more preferably between 10% and 20%, and particularly preferably between 12% and 18%. In the case of two-types and three-layers A/B/A configuration, the thickness ratio of the A-layer of the surface layer described above means the sum of thickness ratios of both surface layers, and in the case of three-types three-layers A/B/C configuration, the thickness ratio of A-layer and C-layer of the surface layer mentioned above means the sum of thickness ratio of both surface layers. When the thickness ratio of A-layer or A-layer and C-layer is less than 5%, the degree of variability of turbidity degree by irregular thickness becomes large and is not preferable. On the other hand, when the thickness ratio of A-layer or A-layer and C-layer exceeds 30%, resistance to bending fatigue is degraded and the number of pinholes increases and at the same time, transparency is degraded, which is not preferable.

Additionally, in order to produce the laminated film as described above, a method for obtaining a practically unoriented polyamide based mixed resin sheet by melting and coextruding each polymer that composes each layer by the use of separate extruders, casting from a nozzle on a rotating drum, and rapidly cooling and solidifying (so-called co-extrusion) can be preferably adopted.

Next discussion will be made on a preferable producing process for obtaining a polyamide based mixed resin laminated film roll of the present invention. The present inventors have studied on thickness irregularity of film roll in the longitudinal direction (thickness irregularity throughout the full length of the film roll), and variations and fluctuations of physical properties such as boiling water shrinkage percentage, and as a result, they have found that the thickness irregularity in the longitudinal direction and variation and fluctuations of the physical properties are greatly susceptible to various factors primarily in a casting process for converting the melted resin into unstretched film. That is, if the temperature of resin when it is fed into a funnel-shape hopper (hereinafter referred to as simply a hopper) directly connected to an extruder is low or the temperature of resin of the moisture content of resin fed into the hopper is high, the thickness irregularity in the longitudinal direction in the unstretched film increases and variations and fluctuations of the physical properties in the biaxially stretched film increase. In addition, the present inventors have found that if the contact point between the resin and the meal roll is displaced when the resin extruded from a T-die is wrapped around a metal roll, the thickness irregularity in the longitudinal direction in the unstretched film increases and variations and fluctuations of the physical properties in the biaxially stretched film increase. Furthermore, the inventors also have found that inappropriate stretching conditions in the biaxially stretching process exacerbate thickness irregularity in the longitudinal direction in the unstretched film, and promote variations and fluctuations of physical properties.

Furthermore, the present inventors have keenly studied on the basis of the foregoing facts, and as a result, have identified that taking the following measures at the time of producing the film roll can provide a film roll with little variations in physical properties and with maintain satisfactory lubricity even under high humidity.

(1) uniformity of shape of polyamide based resin chips and elastomer chips;
(2) reduction of water content in drying resin chips;
(3) retention of temperature in feeding resin to hopper;
(4) optimization of hopper shape;
(5) addition of segregation inhibitor in mixing resin;
(6) removal of detrimental effects by adding segregation inhibitor;
(7) optimization of stretching condition;
(8) use of high-concentration material chips;
(9) adjustment of inorganic particle characteristics; and
(10) adjustment of lamination mode of film Each of the above measures will be sequentially described below.

(1) Uniformity of Shape of Polyamide Based Resin Chips and Elastomer Chips

In the production of polyamide based mixed resin film roll of the present invention, after polyamide resin chips and elastomer chips, which are raw material, are blended in the hopper, they are melted, mixed and kneaded, and extruded from multiple extruders, and formed into film (so-called a mixing system). That is, polyamide based resin chips and elastomer chips are continuously or intermittently fed into separate hoppers, respectively, and eventually, material chips are quantitatively fed into an extruder in accordance with the extrusion amount of the extruder, via a buffer hopper as required, while polyamide based resin chips and elastomer chips are being mixed in a hopper just before or just above the extruder (hereinafter referred to as a "final hopper"), and film is formed.

However, depending on a capacity or shape of final hopper, when the amount of chip in the final hopper is large or when the remaining amount of chip in the final hopper becomes small, there occurs a phenomenon of feedstock segregation, namely, a phenomenon in which chip composition fed to each extruder from the final hopper becomes uneven. Also, such segregation phenomenon appears remarkably, in particular when chip shape or specific gravity is different. Further, resulting from such segregation phenomenon, in the case of producing a long film, there occur the variations of elastic modulus in tension, pinhole resistance, maximum boiling water shrinkage, directional difference of boiling water shrinkage, film thickness and refraction index in the thickness direction.

That is, in the event that there is a difference between the size of polyamide resin chips and the size of elastomer chips, when a mixture of chips falls in a final hopper, smaller chips are apt to fall first, and when the remaining amount of chips in the final hopper reduces, the ratio of larger chips increases, and the material segregation results. Therefore, in order to obtain a film with less variation of physical properties, shapes of polyamide resin chips and elastomer chips must be made equal to suppress the phenomenon of material segregation in the final hopper.

Material chips of polyamide are, in general, taken out in a form of strand from polymerization equipment in the molten state after polymerization, and are immediately water-cooled; then, they are cut by a strand cutter and formed. Consequently, polyamide chips are formed into an elliptic cylinder with an elliptic cross section. On the other hand, material chips of elastomer are frequently formed into a disc shape with an elliptic cross section. Studies on the relationship between the shape of polyamide chips as well as that of elastomer chips and material segregation indicate that the material segregation is able to be reduced by adjusting the average major axis (mm), average minor axis (mm), and average chip length (mm) of the elliptic cross-section of elastomer material chips to be in the range of within ±25% for the average major axis (mm), average minor axis (mm) and average chip length (mm) of the elliptic cross-section of the polyamide based resin chip, respectively. Additionally, adjusting the average major axis, average minor axis, and average chip length of elliptical cross section of thermoplastic elastomer chips to be in the range of within ±20% for the average major axis, average minor axis, and average chip length of elliptical cross section of polyamide based resin chips, respectively, produces remarkably conspicuous segregation prevention effects, which is still more preferable (2) Reduction of Water Content Rate in Drying Resin Chips Chips fed into each hopper are generally heated by a device like blender to reduce moisture therein. In drying the chips, it has been thought that the lower water content in drying in production of polyester film roll or polypropylene film roll generally yields the better film roll due to suppression of hydrolysis in an extrusion step. However, the following fact has been found from the result of the studies by the present inventors: in production of polyamide based mixed resin laminated film roll, a mere reduction of water content in drying makes stretching difficult to yield no film roll of homogenous physical properties, but the water content is controlled within a predetermined range to reserve some level of moisture, which leads to a suitable plasticization without being hydrolyzed in an extrusion step to thereby obtain a film roll with homogenous physical properties. That is, to obtain the film roll of the present invention, it is necessary to control the water contents of polyamide chips and thermoplastic elastomer chips in 800 ppm or more to 1000 ppm or less. When the water content of chips exceeds 1000 ppm, hydrolysis is advanced when melted, which lowers viscosity. Therefore, thickness irregularity of unstretched film in the longitudinal direction is exacerbated and the thickness irregularity of biaxially stretched film in the longitudinal direction is increased, which causes the variation and fluctuation of physical properties. On the other hand, when the water content of chips is below 800 ppm, viscosity when melted becomes too high, which deteriorates film forming property (ease of stretching). Additionally, most suitable water content of chips fed to a hopper is 850 ppm or more to 950 ppm or less.

(3) Retention of Temperature in Feeding Resin to each Hopper

As described above, even in the case of adjusting water content of chip to 800 ppm or more to 1000 ppm or less, a film roll with homogenous physical properties cannot be obtained when chips after heat-drying allowed to stand to cool down to ambient (room) temperature are fed into a hopper. Namely, to obtain a film roll of the present invention, it is necessary to feed into each hopper continuing to each extruder while keeping the chips heat-dried by a blender etc. to high temperature. Specifically, it is necessary to feed them into each hopper while keeping the chips heat-dried by a blender to 80° C. or more, it is more preferably to feed them into each hopper while keeping them to 90° C. or more. When the temperature of chips fed to each hopper is below 80° C., poor resin charging results. This causes thickness irregularity in the longitudinal direction, and variation and fluctuation of physical properties, which produces no film roll of the present invention. Additionally, in drying chips by devices such as a blender, drying temperature is required to be adjusted at 150° C. or less. When the drying temperature exceeds 150° C., it is not preferable because hydrolysis may occur in drying. Also, when the temperature of chips heat-dried by a blender is below 80° C., it is necessary to reheat the chips so as to be 80° C. or more before feeding them into a hopper.

(4) Optimization of Hopper Shape

It is effective for reducing material segregation that using a funnel-shaped hopper as a final hopper continuing to each extruder whose angle of slope is set to 70° or more, thereby large chips can fall easily in the same manner as small chips, and the upper end part of contents goes down while keeping its horizontal plane. More preferable angle of slope is 75° or more. Additionally, angle of slope of hopper means an angle between funnel-shape oblique line and horizontal line segment. A plurality of hoppers may be used for upstream the final hopper; in such event, all the hoppers must have an angle of inclination of 70° or more, and more preferably 75° or more.

Also, reducing the ratio of fine powder formed due to shaving feedstock chip used is preferable to suppress the variation of boiling water shrinkage percentage. Since the fine powder advances feedstock segregation, it is preferable to eliminate fine powder formed in process to reduce the ratio of fine powder contained in each hopper. The ratio of fine powder contained is preferably within 1% by weight through the entire steps before feedstock chip enters into an extruder, more preferably within 0.5% by weight. As a specific method for reducing the ratio of fine powder, there can be listed a method of sieving in chip forming step by a strand cutter or passing through a cyclone type air filter in transporting feedstock chip with air.

(5) Addition of Segregation Inhibitor in Mixing Resin

Furthermore, as a means for reducing material segregation in each hopper, it is preferable to add a sublimation segregation inhibitor in mixing polyamide based resin and elastomer in each hopper. As such sublimation segregation inhibitor, low-boiling point glycols are able to be used, and of all, polyoxyethylene polyoxypropylene glycol can be suitably used. In addition, the amount of sublimation segregation inhibitor to be added to material chip of polyamide based resin and material chip of elastomer is preferably in the range of 0.02% to 2.00% with respect to the total weight of polyamide based resin and elastomer. In the case of less than 0.02%, satisfactory segregation prevention effect is unable to be obtained, which is not preferable, and on the contrary, in the case of 2.00% or more, the inhibitor may not be completely sublimed, which is not preferable, either.

In addition, as a means for reducing feedstock segregation in a hopper, setting a suitable capacity of hopper used is also a preferable means. Here, the suitable capacity of each hopper is in a range of 15-120% by weight relative to the extrusion amount per one hour of extruder, more preferable is in a range of 20-100% by weight relative to the extrusion amount per one hour of extruder.

As a method for mixing material chips of polyamide based resin and material chips of elastomer, it is possible to feed them into a final hopper and extruder via intermediate hoppers (buffer hoppers) for mixing.

In mixing multiple kinds of material as polyamide based resin and elastomer, there can be listed a method of mixing while feeding multiple kinds of material chips continuously at a constant rate from a device that continuously feeds a constant amount of material chip into each hopper, or a method of mixing beforehand using a blender or a paddle drier, but in the case of adopting the latter, it is preferable to reduce the size of material chips with care to prevent material segregation from occurring at the time of discharging the mixture.

(6) Removal of Detrimental Effects by Adding Segregation Inhibitor (Suction when Molten Resin makes Contact with Metal Rolls)

In obtaining an unstretched film by melt extrusion of chips, chips are melted by an extruder at 200-300° C. by using co-extrusion method, laminated, and extruded through a T-die to mold (that is, cast) into a film form (laminated sheet form); then, it is quenched by a method of wrapping molten resin around a cooling roll such as metal roll cooled at a predetermined temperature. Additionally, from the points of thickness irregularity in the longitudinal direction, and variation and fluctuation of physical properties, preferable temperature of melt extrusion is 240° C. to 290° C. To obtain a film roll of the present invention, in the case of winding melted resin on a metal roll, it is preferable to force the melted resin to contact a metal roll by the following manner: air gap (namely, a distance between the exit of T-die lip and a surface of chilling roll in the vertical direction) is adjusted to 20-60 mm, and the part contacting the melted resin with the surface of cooling roll is sucked over the entire width of melted resin in the opposite direction to the winding direction by utilizing a suction unit such as vacuum box (vacuum chamber) having a wide suction inlet.

Also, in such event, in order to prevent the sublimation segregation inhibitor described above from blocking molten resin from adhering to the cooling roll, the wind velocity of suction air in the suction inlet must be adjusted to 2.0-7.0 m/sec., and it is more preferably adjusted to 2.5-5.5 m/sec. Further, vacuum box may have a single suction inlet, and it is preferable that the suction inlet divided into a predetermined number of sections in the lateral direction can adjust the wind velocity of suction in each section to make the adjustment of wind velocity of suction easy in the suction inlet. Also, when the casting speed increases, accompanying stream takes place according to the rotation of metal roll, which disturbs close contact of melted resin with a metal roll, thus to make suction more effective by a suction unit, and to improve close contact of melted resin with the metal roll, it is preferable to shield the accompanying stream by equipping a masking shield of flexible material like Teflon (registered trademark) being formed in broad range in the upstream adjacent to the suction unit (the opposite side to the rotation direction of metal roll relative to the suction unit). Further, to obtain a film roll of the present invention, fluctuation of wind velocity of suction (set value) in a vacuum box is required to be suppressed within ±20% to the average wind velocity of suction, more preferably suppressed within ±10%. In addition, to prevent wind velocity of suction in a vacuum box from variation due to oligomer dust etc., it is preferable to control suction power by equipping a filter in a vacuum box and feed back the differential pressure across the filter.

Furthermore, in order to obtain a film roll of the present invention, it is necessary to apply direct current negative electric charges of 90-105 mA at 2-15 kV from a needle-like electrode to a melted resin sheet when the melted resin is wrapped around a cooling roll, and to continuously bring in contact with the metal roll and rapidly cool while glow-discharging. Additionally, in such event, adjusting the direct current negative electric charge to be applied to a range from 7 to 14 kV reduces thickness irregularity in the longitudinal direction as well as variations and fluctuations of physical properties, which is preferable. In addition, in order to obtain the film roll of the present invention, it is necessary to suppress variations of direct current negative electric charge to be applied within ±20% of the average negative electric charge (set value) and more preferably to suppress within ±10%.

(7) Suitable Stretching Condition

As a method of biaxially stretching an unstretched film, it is necessary to adopt a longitudinal and transverse stretching method that an unstretched film is stretched by a roll-type stretching machine in the longitudinal direction, stretched by a tenter-type stretching machine in the transverse direction, then thermally fixed and relaxed. Further, to obtain a film roll by the production method of the present invention, as a method of biaxial stretching, it needs to adopt so called longitudinal-longitudinal-transverse stretching method. Such the longitudinal-longitudinal-transverse stretching method is the following method: in longitudinal-stretching of an essentially unoriented polyamide film, the first-stage stretching is conducted, without cooling at Tg or less, and continuously the second-stage stretching is conducted, and then transverse stretching is conducted in a ratio of 3.0 times or more, preferable 3.5 times or more, and further thermally fixed. Moreover, to obtain a film roll of the present invention, in conducting the longitudinal-longitudinal-transverse stretching described above, a longitudinal stretching ratio in the first stage must be higher than a longitudinal stretching ratio in the second stage. Namely, by setting a longitudinal stretching ratio in the first stage higher than a longitudinal stretching ratio in the second stage, it becomes possible to obtain a film roll having excellent physical properties such as boiling water shrinkage percentage and less fluctuation of these physical properties. Additionally, in the case of conducting the longitudinal-longitudinal-transverse stretching, generally, when a longitudinal stretching ratio in the first stage is lower than a longitudinal stretching ratio in the second stage, stretching is easily carried out without adhesion on a roll in the first stage. On the other hand, even when a longitudinal stretching ratio in the first stage is higher than a longitudinal stretching ratio in the second stage, stretching can be easily carried out without adhesion on a roll by using a special roll such as roll made of Teflon (registered trademark).

In the case of conducting the longitudinal-longitudinal-transverse stretching described above, it is preferable that a longitudinal stretching in the first stage is carried out in a temperature of 80-90° C. and a ratio of about 2.0-2.4 times. It is not preferable that the stretching ratio in the first stage is high beyond the foregoing range because thickness irregularity in the longitudinal direction becomes large. In addition thereto, it is preferable that a longitudinal stretching in the second stage is carried out in a temperature of 65-75° C. and a ratio of about 1.3-1.7 times. It is not preferable that the stretching ratio in the second stage is low beyond the foregoing range because distortion in boiling is too large to have a practical use. Reversely, it is not preferable that the stretching ratio in the second stage is high beyond the foregoing range because strength (strength at 5% extension) in the longitudinal direction is too low to have a practical use.

Also, in the case of conducting the longitudinal-longitudinal-transverse stretching described above, a longitudinal stretching method can employ a heated roll stretching or an infrared radiation stretching. Also, in the case where a film roll of the present invention is produced by such longitudinal-longitudinal-transverse stretching method, it is possible to reduce not only thickness irregularity, the variation and fluctuation of physical properties in the longitudinal direction but also the variation and fluctuation of physical properties in the transverse direction. Also, in the case of conducting the longitudinal-longitudinal-transverse stretching, the total longitudinal stretching condition is preferably 3.0 to 4.5 times.

Also, in the case of conducting the longitudinal-longitudinal-transverse stretching, it is preferable that transverse stretching is carried out in a temperature of 120-140° C. and a ratio of about 4.0-5.5 times. It is not preferable that the transverse stretching ratio is low beyond the foregoing range because strength (strength at 5% extension) in the transverse direction is too low to have a practical use, reversely, it is not preferable that the transverse stretching ratio is high beyond the foregoing range because thermal shrinkage in the transverse direction becomes high. Moreover, it is not preferable that temperature in transverse stretching is low beyond the foregoing range because distortion in boiling is too large to have a practical use, reversely, it is not preferable that temperature in transverse stretching is high beyond the foregoing range because strength (strength at 5% extension) in the transverse direction is too low to have a practical use.

Further, to obtain a film roll of the present invention, thermal fixation treatment after the longitudinal-longitudinal-transverse stretching is preferably conducted in a temperature of 180-230° C. When the temperature in the thermal fixation treatment is low beyond the foregoing range, it is not preferable because thermal shrinkage in the longitudinal direction and transverse direction is large, and reversely, when the temperature in the thermal fixation treatment is high beyond the foregoing range, it is not preferable because impact strength of biaxially stretched film becomes low.

In addition, to obtain a film roll of the present invention, relaxation treatment after thermal fixation is preferably carried out in a relaxation of 2-10%. When the relaxation treatment ratio is low beyond the foregoing range, it is not preferable because thermal shrinkage in the longitudinal direction and transverse direction becomes large, and reversely, when the relaxation treatment ratio is high beyond the foregoing range, it is not preferable because strength (strength at 5% extension) in the longitudinal direction and the width direction is too low to have a practical use.

Also, width of film roll is not particularly limited, but the lower limit of width of film roll is preferably 0.35 m or more from the point of easy handling, more preferably 0.50 m or more. On the other hand, the upper limit of width of film roll is preferably 2.5 m or less, more preferably 2.0 m or less, and further preferably 1.5 m or less. In addition, winding length is also not particularly limited, but the lower limit of width of film roll is preferably 500 m or more from the points of easy winding and easy handling, more preferably 1000 m or more. On the other hand, the upper limit of winding length of film roll is preferably 25000 m or less, more preferably 20000 m or less, and further preferably 15000 m or less. Additionally, in the case of film thickness of about 15 μm, 12000 m or less is particularly preferable. Also, winding core can ordinarily employ a paper, plastic or metal core with 3 inches, 6 inches, 8 inches and the like.

Moreover, thickness of film composing film roll of the present invention is also not particularly limited, for example, as a polyamide based film for packaging, 8-50 μm is preferable, 10-30 μm is further preferable.

In addition, a polyamide based mixed resin laminated film that composes the film roll of the present invention can contain various kinds of additives, within the range that the characteristics are not damaged, such as lubricant, anti-blocking agent, thermal stabilizer, antioxidant, antistatic agent, light resistant agent, and impact modifier. In particular, it is preferable to contain various kinds of inorganic particles so as to improve lubricity of biaxially stretched film. Furthermore, it is preferable to add an organic lubricant such as ethylene-bis-stearic acid, etc. which exhibits the effect of lowering surface energy because excellent lubricity can be imparted to the film that composes the film roll.

Further, polyamide based mixed resin laminated film composing a film roll of the present invention can be subjected to thermal treatment or humidity adjusting treatment to improve the dimensional stability according to the applications. In addition, it can be provided with corona treatment, coating treatment or flame treatment to give better adhesion of film surface, and also processed by printing, deposition or the like.

(8) Use of High-Concentration Material Chips

As described above, in order to improve the lubricity under high humidity of the biaxially oriented film, it is preferable to allow various inorganic particles to be contained in polyamide based resin and adjust the surface roughness of the film but in such event, by adding inorganic particles by a specific addition method, satisfactory lubricity under high humidity can be developed. That is, when inorganic particles are added to polyamide based resin, it is preferable not to add and knead powdery inorganic particles in an extruder but to adopt a method for preparing master batch polymer chips with high-concentration inorganic particles added in polyamide based resin in advance and blend-diluting the master chips (high-concentration material chips) with polyamide based resin free of inorganic particles. By adopting this kind of means, dispersibility of inorganic particles is improved by allowing inorganic particles to grind one another on a melt-line, and as a result, good effect would be exerted on the lubricity under high humidity.

Furthermore, it is preferable to add inorganic particles to polyamide based resin by 5-20% by weight when high-concentration material chips are produced, and more preferable to add by 10-15% by weight. When the adding amount of the inorganic particles exceeds 20% by weight, the dispersibility of inorganic particles is lowered, and a possibility of forming foreign matters in the film are generated, which is not preferable. On the contrary, when the adding amount of the inorganic particles exceeds 5% by weight, the economic efficiency is degraded, which is not preferable. In addition, when such high-concentration material chips are prepared, kneading with inorganic particles after polyamide resin is made into powdery fine particles by a method of pulverizing in a frozen state, the dispersibility of inorganic particles into the resin is improved, which is preferable.

(9) Adjustment of Inorganic Particle Characteristics

It becomes possible to develop satisfactory lubricity under high humidity by specializing the characteristics of inorganic particles to be added to polyamide resin that composes the skin layer when organic particles are added to polyamide based resin. That is, for inorganic particles to be added, those with an average particle size (that is, average particle size) of 0.5 to 5.0 μm are preferable and silica particles are particularly preferable. When the average particle size is below 0.5 μm, no satisfactory lubricity can be obtained, whereas when the average particle size exceeds 0.5 μm, it is not preferable because transparency becomes poor and so called "strike-through" on printing occurs. Additionally, the average particle size can be measured by employing a method in which a weight-average diameter can be calculated from a particle distribution obtained by a Coulter counter, it can be determined from the measurement of particles before addition to polyamide resin, and also can be determined from the measurement of particle separated out by dissolving polyamide based mixed resin laminated film in acid. In addition, it is preferable that the pore volume of inorganic particles is between 0.5 and 2.0 mL/g, and more preferably between 0.8 and 1.5 mL/g. When the pore volume is below 0.5 mL/g, film transparency is degraded, which is not preferable. When the pore volume exceeds 2.0 mL/g, film lubricity is degraded, which is not preferable. In addition, it is preferable not only to add inorganic particles in polyamide resin that composes the skin layer but also to add a small amount of inorganic particles by 0.001 to 0.005% by weight in polyamide resin that composes the core layer because the lubricity under high humidity can be remarkably improved, and it is more preferable to add inorganic particles by 0.002 to 0.004% by weight. In addition, it is preferable to make the particle size of inorganic particles to be added to the core layer greater than the thickness of the skin layer because more stable lubricity under high humidity can be achieved. Additionally, it is not clear why the lubricity under high humidity becomes stable in such a manner but the inventors of the present invention consider that the undulation action of the film surface by inorganic particles in the core layer exerts good effects on the lubricity under the high humidity.

(10) Adjustment of Lamination Mode of Film

As described above, by adding inorganic particles to polyamide based resin and forming unevenness on the film surface, lubricity is able to be developed, but in such event, by adjusting the film lamination mode, it becomes possible to develop satisfactory lubricity under high moisture. That is, in the production of the film roll of the present invention, using the co-extrusion method as described above and melt-extruding resin from multiple extruders, laminated film (laminated sheet) with multiple layer structure is formed, but in such event, it is preferable to adjust the discharge rate of resin melt-extruded as a skin layer in such a manner that the final skin layer thickness after stretching becomes 0.5 to 4.0 μm, and is more preferable to adjust to be 1.0 to 3.0 μm.

Additionally, when the unstretched laminated film is formed, it becomes possible to reduce the thickness irregularity of each layer which composes laminated film by using the means of Paragraphs (1) through (5) as well as Paragraphs (8) through (10) and by using the means of Paragraphs (6) and (7) in the unstretched laminated film stretching process, and eventually, the thickness irregularity of the overall laminated film can be reduced. Then, it is assumed due to this, it would be possible to reduce the variations of physical properties of the film roll remarkably efficiently. It should be noted that any specific one of the means of Paragraphs (1) through (10) only can effectively contribute to reduction of variations of physical properties of the film roll but by using the means of Paragraphs (1) through (10) in combination, it is assumed that the variations of physical properties of the film roll can be very efficiently reduced.

EXAMPLES

The present invention will be described in detail with reference to Examples as below; the present invention is not limited to the aspects of Examples and can be suitably modified to the extent not departing from the spirit of the present invention. Tables 1 through 4 show characteristics and composition of material chips A to I used in Examples and Comparative Examples, and film forming conditions of film rolls in Examples and Comparative Examples, respectively. Additionally, chip A consists of 99.85% by weight of nylon 6

(relative viscosity=2.8, Tg=41° C.) and 0.15% by weight of ethylene bisstearic acid amide; and chips B and C consist of 85.00% by weight of nylon 6 (physical properties same as chip A) and 15.0% by weight of silica particle whose average particle size is 2.0 μm and pore volume is 0.8 mL/g, respectively. In addition, the shapes of chips A through C are all elliptic cylinders, and chips A and B have the identical cross-sectional major axis, cross-sectional minor axis and chip length. In addition, chips D and I consist of copolymer (relative viscosity=2.0) of nylon 12 and PTMG (polytetramethylene glycol), and chip E consists of copolymer (relative viscosity=2.4) of nylon 6 and PEG (polyethylene glycol), chip F consists of ethylene methacrylic acid copolymer (MFR (Melt Flow Rate) at 190° C.=2.4 g/10 minutes), chip G consists of ethylene butene copolymer (MFR=2.0 g/10 minutes), and chip H consists of ethylene based ionomer (MFR=2.4 g/10 m minutes). In addition, the shapes of chips D through I are all elliptic cylinders, while chips D through H have identical cross sectional major axis, cross sectional minor axis, and chip length.

TABLE 1

| | Composition of resin etc. | | Lubricant | | | Shape (average: mm) | | |
|---|---|---|---|---|---|---|---|---|
| | Nylon 6 (% by weight) | Ethylene-bis-stearamide (% by weight) | Average particle size (μm) | Pore volume (mL/g) | Amount added (% by weight) | Major axis of cross section | Minor axis of cross section | Chip length |
| Chip A | 99.85 | 0.15 | — | — | — | 2.4 | 2.2 | 2.1 |
| Chip B | 85.00 | — | 2.0 | 0.8 | 15.0 | 2.4 | 2.2 | 2.1 |
| Chip C | 85.00 | — | 2.0 | 0.8 | 15.0 | 4.5 | 2.2 | 4.8 |

TABLE 2

| | Composition of resin, etc. | Trade name of the resin | Shape (average: mm) | | | Relative viscosity | MFR (190° C.) (g/10 min.) |
|---|---|---|---|---|---|---|---|
| | | | Cross-sectional major axis | Cross-sectional minor axis | Chip length | | |
| Chip D | Nylon 12/PTMG copolymer | DA330 available from Toyobo Co., Ltd. | 2.5 | 2.2 | 2.2 | 2.0 | — |
| Chip E | Nylon 6/PEG copolymer | Pebax ® MH1657 available from ARKEMA K. K. | 2.5 | 2.2 | 2.2 | 2.4 | — |
| Chip F | Ethylene methacrylic acid copolymer | NUCREL ® NO502 available from Du Pont-Mitsui Polychemicals Co., Ltd. | 2.5 | 2.2 | 2.2 | — | 2.4 |
| Chip G | Ethylene butene copolymer | TAFMER ® A4085 available from Mitsui Chemicals, Inc. | 2.5 | 2.2 | 2.2 | — | 2.0 |
| Chip H | Ethylene based ionomer | HIMILAN ® available from Du Pont-Mitsui Polychemicals Co., Ltd. | 2.5 | 2.2 | 2.2 | — | 2.4 |
| Chip I | Nylon 12/PTMG copolymer | Pebax ® 4033 available from ARKEMA K. K. | 4.5 | 2.2 | 2.8 | 2.0 | — |

TABLE 3

| | Lamination mode | | Film-forming conditions (extrusion to cooling) | | | | | |
|---|---|---|---|---|---|---|---|---|
| | | | First layer (outer layer) extruder conditions | | | | | Second layer (intermediate layer) extruder conditions |
| | Layer structure | Layer thickness ratio (outer layer/intermediate layer/inner layer) (μm) | Mixing ratio of resin (wt %) | Addition amount of segregation inhibitor (ppm) | Hopper inclination angle (degrees) | Chip moisture content (ppm) | Chip temperature at the time of feeding to a hopper (° C.) | Mixing ratio of resin (wt %) |
| Example 1 | 2-type, 3-layer | 2/11/2 | A/B/D = 96.5/0.5/3 | 1000 | 70 | 800 | 91 | A/B/D = 96.97/0.03/3 |
| Example 2 | 2-type, 3-layer | 2/11/2 | A/B/D = 96/1/3 | 1000 | 70 | 800 | 91 | A/B/D = 96.94/0.05//3 |
| Example 3 | 2-type, 3-layer | 1/13/1 | A/B/D = 96.5/0.5/3 | 1000 | 70 | 800 | 91 | A/B/D = 96.97/0.03/3 |
| Example 4 | 2-type, 3-layer | 2/11/2 | A/B/D = 96.5/0.5/3 | 1000 | 70 | 800 | 91 | A/B/D = 96.97/0.03/3 |
| Example 5 | 2-type, 3-layer | 2/11/2 | A/B/D = 96.5/0.5/3 | 1000 | 70 | 800 | 91 | A/B/D = 96.97/0.03/3 |
| Example 6 | 2-type, 3-layer | 2/11/2 | A/B/D = 96.5/0.5/3 | 1000 | 65 | 800 | 91 | A/B/D = 96.97/0.03/3 |
| Example 7 | 2-type, 3-layer | 2/11/2 | A/B/D = 89.5/0.5/10 | 1000 | 70 | 800 | 91 | A/B/D = 89.97/0.03/10 |
| Example 8 | 2-type, 3-layer | 2/11/2 | A/B/E = 94.5/0.5/5 | 1000 | 70 | 800 | 91 | A/B/E = 94.97/0.03/5 |
| Example 9 | 2-type, 3-layer | 2/11/2 | A/B/F = 94.5/0.5/5 | 1000 | 70 | 800 | 91 | A/B/F = 94.97/0.03/5 |
| Example 10 | 2-type, 3-layer | 2/11/2 | A/B/G = 94.5/0.5/5 | 1000 | 70 | 800 | 91 | A/B/G = 94.97/0.03/5 |
| Example 11 | 2-type, 3-layer | 2/11/2 | A/B/H = 94.5/0.5/5 | 1000 | 70 | 800 | 91 | A/B/H = 94.97/0.03/5 |

TABLE 3-continued

| | | | | | | | | |
|---|---|---|---|---|---|---|---|---|
| Comparative example 1 | 1-type, 1-layer | —/15/— | — | — | — | — | — | A/B/D = 96.5/1.5/3 |
| Comparative example 2 | 2-type, 3-layer | 2/11/2 | A/C/D = 96.5/0.5/3 | 1000 | 70 | 800 | 91 | A/C/D = 96.97/0.03/3 |
| Comparative example 3 | 2-type, 3-layer | 2/11/2 | A/B/J = 96.5/0.5/3 | 1000 | 70 | 800 | 91 | A/B/J = 96.97/0.03/3 |
| Comparative example 4 | 2-type, 3-layer | 2/11/2 | A/B/D = 96.5/0.5/3 | 1000 | 45 | 800 | 91 | A/B/D = 96.97/0.03/3 |
| Comparative example 5 | 2-type, 3-layer | 2/11/2 | A/B/D = 96.5/0.5/3 | 1000 | 70 | 800 | 30 | A/B/D = 96.97/0.03/3 |
| Comparative example 6 | 2-type, 3-layer | 2/11/2 | A/B/D = 96.5/0.5/3 | 1000 | 70 | 1500 | 85 | A/B/D = 96.97/0.03/3 |
| Comparative example 7 | 2-type, 3-layer | 2/11/2 | A/B/D = 96.5/0.5/3 | 0 | 70 | 800 | 91 | A/B/D = 96.97/0.03/3 |
| Comparative example 8 | 2-type, 3-layer | 2/11/2 | A/B/D = 96.5/0.5/3 | 1000 | 70 | 800 | 91 | A/B/D = 96.97/0.03/3 |

| | Film-forming conditions (extrusion to cooling) | | | | | | | | | |
|---|---|---|---|---|---|---|---|---|---|---|
| | Second layer (intermediate layer) extruder conditions | | | | | Third layer (inner layer) extruder conditions | | | | |
| | Addition amount of segregation inhibitor (ppm) | Hopper inclination angle (degrees) | Chip moisture content (ppm) | Chip temperature at the time of feeding to a hopper (° C.) | Mixing ratio of resin (wt %) | Addition amount of segregation inhibitor (ppm) | Hopper inclination angle (degrees) | Chip moisture content (ppm) | Chip temperature at the time of feeding to a hopper (° C.) | Suction wind velocity of vacuum box (m/min) |
| Example 1 | 1000 | 70 | 800 | 91 | A/B/D = 96.5/0.5/3 | 1000 | 70 | 800 | 91 | 5.0 ± 0.5 |
| Example 2 | 1000 | 70 | 800 | 91 | A/B/D = 96/1/3 | 1000 | 70 | 800 | 91 | 5.0 ± 0.5 |
| Example 3 | 1000 | 70 | 800 | 91 | A/B/D = 96.5/0.5/3 | 1000 | 70 | 800 | 91 | 5.0 ± 0.5 |
| Example 4 | 1000 | 70 | 800 | 91 | A/B/D = 96.5/0.5/3 | 1000 | 70 | 800 | 91 | 5.0 ± 0.5 |
| Example 5 | 1000 | 70 | 800 | 91 | A/B/D = 96.5/0.5/3 | 1000 | 70 | 800 | 91 | 5.0 ± 0.5 |
| Example 6 | 1000 | 65 | 800 | 91 | A/B/D = 96.5/0.5/3 | 1000 | 65 | 800 | 91 | 5.0 ± 0.5 |
| Example 7 | 1000 | 70 | 800 | 91 | A/B/D = 89.5/0.5/10 | 1000 | 70 | 800 | 91 | 5.0 ± 0.5 |
| Example 8 | 1000 | 70 | 800 | 91 | A/B/E = 94.5/0.5/5 | 1000 | 70 | 800 | 91 | 5.0 ± 0.5 |
| Example 9 | 1000 | 70 | 800 | 91 | A/B/F = 94.5/0.5/5 | 1000 | 70 | 800 | 91 | 5.0 ± 0.5 |
| Example 10 | 1000 | 70 | 800 | 91 | A/B/G = 94.5/0.5/5 | 1000 | 70 | 800 | 91 | 5.0 ± 0.5 |
| Example 11 | 1000 | 70 | 800 | 91 | A/B/H = 94.5/0.5/5 | 1000 | 70 | 800 | 91 | 5.0 ± 0.5 |
| Comparative example 1 | 1000 | 70 | 800 | 91 | — | — | — | — | — | 5.0 ± 0.5 |
| Comparative example 2 | 1000 | 70 | 800 | 91 | A/C/D = 96.5/0.5/3 | 1000 | 70 | 800 | 91 | 5.0 ± 0.5 |
| Comparative example 3 | 1000 | 70 | 800 | 91 | A/B/J = 96.5/0.5/3 | 1000 | 70 | 800 | 91 | 5.0 ± 0.5 |
| Comparative example 4 | 1000 | 45 | 800 | 91 | A/B/D = 96.5/0.5/3 | 1000 | 45 | 800 | 91 | 5.0 ± 0.5 |
| Comparative example 5 | 1000 | 70 | 800 | 30 | A/B/D = 96.5/0.5/3 | 1000 | 70 | 800 | 30 | 5.0 ± 0.5 |
| Comparative example 6 | 1000 | 70 | 1500 | 85 | A/B/D = 96.5/0.5/3 | 1000 | 70 | 1500 | 85 | 5.0 ± 0.5 |
| Comparative example 7 | 0 | 70 | 800 | 91 | A/B/D = 96.5/0.5/3 | 0 | 70 | 800 | 91 | 5.0 ± 0.5 |
| Comparative example 8 | 1000 | 70 | 800 | 91 | A/B/D = 96.5/0.5/3 | 1000 | 70 | 800 | 91 | 5.0 ± 0.5 |

TABLE 4

| | Film forming conditions (Stretching to heat treatment) | | | | | | | |
|---|---|---|---|---|---|---|---|---|
| | First longitudinal stretching | | Second longitudinal stretching | | Transverse stretching | | Thermal fixation (° C.) | Relaxation treatment (%) |
| | Temperature (° C.) | Ratio | Temperature (° C.) | Ratio | Temperature (° C.) | Ratio | | |
| Example 1 | 85 | 2.1 | 70 | 1.6 | 130 | 4.0 | 210 | 5.0 |
| Example 2 | 85 | 2.1 | 70 | 1.6 | 130 | 4.0 | 210 | 5.0 |
| Example 3 | 85 | 2.1 | 70 | 1.6 | 130 | 4.0 | 210 | 5.0 |
| Example 4 | 85 | 2.2 | 70 | 1.5 | 130 | 4.0 | 210 | 5.0 |
| Example 5 | 85 | 2.1 | 70 | 1.6 | 130 | 3.6 | 215 | 3.0 |
| Example 6 | 85 | 2.1 | 70 | 1.6 | 130 | 4.0 | 210 | 5.0 |
| Example 7 | 85 | 2.1 | 70 | 1.6 | 130 | 4.0 | 210 | 5.0 |
| Example 8 | 85 | 2.1 | 70 | 1.6 | 130 | 4.0 | 210 | 5.0 |
| Example 9 | 85 | 2.1 | 70 | 1.6 | 130 | 4.0 | 210 | 5.0 |

TABLE 4-continued

| | Film forming conditions (Stretching to heat treatment) | | | | | | | |
|---|---|---|---|---|---|---|---|---|
| | First longitudinal stretching | | Second longitudinal stretching | | Transverse stretching | | Thermal fixation | Relaxation treatment |
| | Temperature (° C.) | Ratio | Temperature (° C.) | Ratio | Temperature (° C.) | Ratio | (° C.) | (%) |
| Example 10 | 85 | 2.1 | 70 | 1.6 | 130 | 4.0 | 210 | 5.0 |
| Example 11 | 85 | 2.1 | 70 | 1.6 | 130 | 4.0 | 210 | 5.0 |
| Comparative example 1 | 85 | 2.1 | 70 | 1.6 | 130 | 4.0 | 210 | 5.0 |
| Comparative example 2 | 85 | 2.1 | 70 | 1.6 | 130 | 4.0 | 210 | 5.0 |
| Comparative example 3 | 85 | 2.1 | 70 | 1.6 | 130 | 4.0 | 210 | 5.0 |
| Comparative example 4 | 85 | 2.1 | 70 | 1.6 | 130 | 4.0 | 210 | 5.0 |
| Comparative example 5 | 85 | 2.1 | 70 | 1.6 | 130 | 4.0 | 210 | 5.0 |
| Comparative example 6 | 85 | 2.1 | 70 | 1.6 | 130 | 4.0 | 210 | 5.0 |
| Comparative example 7 | 85 | 2.1 | 70 | 1.6 | 130 | 4.0 | 210 | 5.0 |
| Comparative example 8 | 90 | 1.5 | 70 | 2.2 | 130 | 4.0 | 210 | 5.0 |

Example 1

By using co-extrusion method, from three extruders (Extruders No. 1 through No. 3), polyamide based mixed resin was melt-extruded (laminated in a die and extruded), wrapped around a rotating metal roll cooled to 17° C. and rapidly cooled, and an unstretched film (polyamide based resin laminated sheet) in a thick of 257 μm and of two-types three-layer structure was obtained. The method of forming each layer of unstretched film (process up to melt-extrusion) is described as follows. Additionally, in the following description, the laminated layers are called a first layer, a second layer, and a third layer successively from the surface layer of the polyamide based mixed resin laminated sheet (that is, the surface of the third layer is the contact surface of the metal roll).

Formation of the First Layer (Outer Layer)

The above-described chips A, B and D were separately pre-dried while heating at about 120° C. for about 8.0 hours using a blender apparatus of 15 kl. Each chip was sampled from the blender by a predetermined amount and its water content was measured to find that every chip A, B and D had 800 ppm of water content. Additionally, the water content was measured under the conditions of sample weight of 1 g and sample heating temperature of 230° C. using a Karl Fisher moisture meter (MKC-210 manufactured by KYOTO Electronics Corp.).

Then, each chip in each blender after pre-drying were separately supplied continuously to a mixing mixer by a constant-rate screw feeder. Additionally, the amount supplied of chip A was set to 96.5% by weight and the amount supplied of chip B was set to 0.5% by weight and the amount supplied of chip D was set to 3.0% by weight. In addition, in the hopper to which chip A and chip B were supplied, as a sublimation segregation inhibitor, polyoxyethylene polyoxypropylene glycol (NEWPOL PE-64 available from Sanyo Chemical Industry) were added in such a manner that the polyoxyethylene polyoxypropylene glycol attains a concentration of 1000 ppm to the total weight of Chips A, B, and D.

Thereafter, the material mixture of Chips A, B, and D mixed in the mixing mixer as described above was continuously and separately supplied to a hopper just above an extruder (extruder No. 1) by a constant-rate screw feeder. The hopper had a capacity to contain 150 kg of material chips. The inclination angle of the hopper was adjusted to 70°.

Also, in feeding chips A, B, and D into a hopper via a mixing mixer, the chips were fed to the hopper in a short period of time from drying so that the temperature of chips did not become too low. The temperature of chips A, B, and D just before being fed into the hopper was about 91° C. Then, the chips A, B and D (mixed) fed were melt-extruded through a T-die at 270° C. by a the monoaxial type extruder No. 1.

Formation of the Second Layer (Intermediate Layer)

Chips A, B and D dried as described above in each blender were separately and continuously supplied to a mixing mixer by a constant-rate screw feeder. Additionally, the amount supplied of chip A was set to 96.97% by weight, the amount supplied of chip B was set to 0.03% by weight, and the amount supplied of chip D was set to 3.0% by weight. In addition, in the hopper to which chip A and chip B were supplied, as a sublimation segregation inhibitor, polyoxyethylene polyoxypropylene glycol (NEWPOL PE-64 available from Sanyo Chemical Industry) were added in such a manner that the polyoxyethylene polyoxypropylene glycol attains a concentration of 1000 ppm to the total weight of Chips A, B, and D.

Thereafter, the material mixture of Chips A, B, and D mixed in the mixing mixer as described above was continuously and separately supplied to a hopper just above an extruder (extruder No. 2) by a constant-rate screw feeder. The hopper had a capacity to contain 150 kg of material chips. The inclination angle of the hopper was adjusted to 70°.

Furthermore, when chips A, B and D were supplied into the hopper via a mixing mixer, chips were supplied into the hopper in a short time from drying so that the temperature of each chip did not become too low. Temperatures of chips A, B and D just before they were supplied to the hopper were all about 91° C. Then, chips A, B, and D (mixed) supplied were melt-extruded through a T-die at 270° C. by the monoaxial type extruder No. 2.

Formation of the Third Layer (Inner Layer)

Chips A, B and D dried as above in each blender were separately and continuously supplied into a mixing mixer by a constant-rate feeder. Additionally, the amount supplied of chip A was set to 96.5% by weight, the amount supplied of chip B was set to 0.5% by weight, and the amount supplied of chip D was set to 3.0% by weight. In addition, in the hopper to which chip A and chip B were supplied, as a sublimation segregation inhibitor, polyoxyethylene polyoxypropylene glycol (NEWPOL PE-64 available from Sanyo Chemical Industry) were added in such a manner that the polyoxyethylene polyoxypropylene glycol attains a concentration of 1000 ppm to the total weight of Chips A, B, and D.

Thereafter, the material mixture of Chips A, B, and D mixed in the mixing mixer as described above was continuously and separately supplied to a hopper just above an extruder (extruder No. 3) by a constant-rate screw feeder. The hopper had a capacity to accommodate 150 kg of material chips. The inclination of hopper angle was adjusted to 70°.

Furthermore, when chips A, B and D were supplied into the hopper via the mixing mixer, chips were supplied into the hopper in a short time from drying so that the temperature of chips inside each blender does not become too low. Temperatures of chips A, B and D just before they are supplied to the hopper were about 91° C. in both cases. Then, chips A, B and D (mixed) supplied were melt-extruded through a T-die at 270° C. by the monoaxial type extruder No. 3.

Additionally, in each extruder of example 1, the average major axis, average minor axis, and average chip length of the thermoplastic elastomer chip (chip D) were included in the range within ±20%, respectively, with respect to the average major axis, average minor axis, and average chip length of each polyamide based resin chip (chip A and B). The discharge rate of the extruders No. 1 through No. 3 in forming the unstretched film was adjusted in such a manner that the thickness ratio of the first layer/the second layer/the third layer achieves 2/11/2.

Also, an air gap in winding melted resin around a metal roll was adjusted to 40 mm, by applying a direct current negative charge of 100 mA at 11±1.1 kV with a needle electrode to yield glow discharge, and melted resin was electrostatically attached closely on the metal roll. Further, in winding melted resin around a metal roll, the part contacting the melted resin with the metal roll was sucked over the entire width of melted resin by using a vacuum box in the opposite direction to the direction of winding the resin to promote close contact of the melted resin with the metal roll. Additionally, the suction wind velocity of the vacuum box was adjusted to be 5.0±0.5 m/sec. throughout the full width of suction inlet (that is, full width of melted resin).

After, the resultant unstretched film was longitudinally stretched (first longitudinal stretching) in stretching temperature of about 85° C. and about 2.1 times by a Teflon roll (registered trademark), then longitudinally stretched (second longitudinal stretching) in stretching temperature of about 70° C. and about 1.6 times by a ceramic roll. Further, the longitudinal stretched sheet was continuously led to a tenter, transversely stretched at about 130° C. and 4.0 times, thermally fixed at about 210° C., subjected to transverse relaxation treatment of 5.0% and then cooled, by cutting the both edge parts to eliminate, thereby to form a biaxially stretched film of about 15 µm and 2000 m or more continuously and produce a mill roll. When the laminated film obtained after biaxially stretching was sliced thinly in the thickness direction and observed by electron microscope, the thickness of the first layer, the second layer, and the third layer were about 2 µm, about 11 µm, and about 2 µm, respectively.

Additionally, the variation widths of film surface temperature when a film is produced continuously in 2000 m were within ±0.8° C. to the average temperature in the pre-heating step, ±0.6° C. to the average temperature in the stretching step and ±0.5° C. to the average temperature in the thermal treatment step. Further, the resultant mill roll was slit into 400 mm in width and 2000 m in length, and winded up on 3 inch paper tube to give two polyamide based mixed resin laminated film rolls (slit rolls). Then, using the two slit rolls thus obtained (namely, obtained from the same mill roll), the characteristics were evaluated in the following methods. Additionally, for the following measurements of BS (boiling water shrinkage percentage), BSx (maximum boiling water shrinkage percentage), BSd (directional difference of boiling water shrinkage percentage) and refraction index, sample films were prepared as follows: a first sample cutout portion was set up within 2 m from the winding end of film, sample cutout portions from a second to 20th were set up in approximately every 100 m from the first sample cutout portion, a 21st cutout portion was set up within 2 m from the winding start of film, and sample films were cut out from each of cutout portions from the first to the 21st. The evaluation results are shown in Tables 5 to 9. In showing the evaluation results, an average of values of each sample measured and variation range of values of each sample are shown for impact strength and laminate strength. Also, regarding the S-shaped curl, the numbers of samples determined in each evaluation level and the total evaluation level of all samples are shown.

[Boiling Water Shrinkage Percentage]

A biaxially oriented film (sample film) cut out from each of cutout portions of one slit roll was cut out in a square with a side of 21 cm, allowed to stand in an atmosphere of 23° C. and 65 RH % for two hours or more. A circle of about 20 cm in diameter centered on this sample was drawn, a longitudinal direction (direction of film drawn out) was set to be 0°, liner lines passing to the center of circle were clockwise drawn at intervals of 15° in the direction of 0 to 165°, and diameter in each direction was measured as the length before treatment. Then, after the sample cut out was thermally treated in boiling water for 30 minutes, it was brought back and water attached on the surface was wiped out, dried in air, allowed to stand in an atmosphere of 23° C. and 65% RH for 2 hours or more, as described above, and the length of linear line drawn to each diametrical direction was measured as the length after treatment. Then, according to the foregoing formulas 1 to 5, the following values were measured, which were, the BS (boiling water shrinkage percentage), BSx (maximum boiling water shrinkage percentage), BSax (average boiling water shrinkage percentage), BSd (directional difference of boiling water shrinkage percentage) and BSad (average directional difference of boiling water shrinkage percentage).

Thereafter, the maximum and the minimum of the maximum boiling water shrinkage percentage (BSx) of all samples were obtained, a larger difference between either the maximum or the minimum and the average boiling water shrinkage percentage (BSax) was calculated, a ratio of which relative to the average boiling water shrinkage percentage (BSax) was calculated, and thereby a degree of variability in the maximum boiling water shrinkage percentage (BSx) relative to the average boiling water shrinkage percentage (BSax) was obtained. Also, the maximum and the minimum of the directional difference of boiling water shrinkage percentage (BSd) of all samples were obtained, a larger difference between either the maximum or the minimum and the average directional difference of boiling water shrinkage percentage (BSad) was calculated, a ratio (%) of which relative to the average directional difference of boiling water shrinkage percentage (BSad) was calculated, and thereby a degree of variability in the directional difference of boiling water shrinkage percentage (BSd) relative to the average directional difference of boiling water shrinkage percentage (BSad) was obtained.

[Three-Dimensional Surface Roughness]

The surface of biaxially oriented film (sample film) cut out from each cutout portion of one side of the slit roll was measured over a measured length of 1 mm at the cutoff value of 0.25 mm in the longitudinal direction of the film by using a needle contact type three-dimensional surface roughness measuring machine (SE-3AK available from Kosaka Laboratory Ltd.) set at stylus radius of 2 μm, load of 30 mg, and stylus speed of 0.1-mm/s, and was divided into 500 points at intervals of 2 μm, and the surface was measured in the width direction of the film over a measured length of 0.3 mm under the conditions same as described above and was divided into 150 points at intervals of 2 μm. The height in the three-dimensional direction of each point of divided points obtained was analyzed by the use of a three-dimensional surface roughness analyzer (TDA-21 available from Kosaka Laboratory Ltd.), and the three-dimensional average surface roughness (nm) was determined.

[Coefficient of Dynamic Friction μd Under High Humidity]

By using the biaxially oriented film cut out from each cutout portion of a slit roll, in compliance with JIS-C2151, the coefficient of dynamic friction between outer layers were evaluated under the following conditions:

Measurement atmosphere: 23° C. and 80% RH
Test piece: 130 mm in width and 250 mm in length
Test speed: 150 mm/min

[Haze]

Haze was measured by the use of a haze meter (300A available from Nippon Denshoku Industries Co., Ltd.) for each biaxially oriented film cut out from each cutout portion of a slit roll in compliance with JIS K7 136. Additionally, the measurement was conducted twice and the average value was determined.

[Content of Inorganic Particles]

The weight of residue was determined when the biaxially oriented film cut out from each cut out portion of a slit roll was combusted at 800° C., and the ratio (percentage) of the residue weight to the film weight before combustion was calculated as the content of inorganic particles (silica). Additionally, in measurement of the content of inorganic particles, a method of determining the weight of residues when the biaxially oriented film cut out from each cutout portion is dissolved in a solvent such as sulfuric acid and calculating the ratio (percentage) of the residue weight to the initial film weight can also be adopted.

[Thickness Irregularity in the Longitudinal Direction]

A slit roll for measurement of thickness irregularity was prepared by slitting a slit roll in about 3 cm width over the entire length in the longitudinal direction. Then, the average thickness, the maximum thickness and the minimum thickness were obtained over the entire length in the longitudinal direction using a thickness irregularity measuring apparatus (wide range high sensitive electronic micrometer K-313A) manufactured by Anritsu Corp. Thereafter, from the following formula 7, a degree of variability in thickness over the entire length in the longitudinal direction was calculated as follows: a larger difference between either the maximum thickness or the minimum thickness and the average thickness was calculated, a ratio of which relative to the average thickness was calculated to give the degree of variability in thickness over the entire-length in the longitudinal direction.

$$\text{Degree of variability in thickness} = |\text{maximum thickness or minimum thickness} - \text{average thickness}| / \text{average thickness} \qquad 7$$

[Refraction Index]

Using an "Abbe refractometer 4T type" manufactured by Atago Co., Ltd, each sample film cut out from each of cutout portions was allowed to stand in an atmosphere of 23° C. and 65 RH % for 2 hours or more, then refraction index in the thickness direction (Nz) was measured. Also, the average refraction index of all samples was calculated, as shown in Table 6, the difference between either the maximum or the minimum of Nz in all samples and the average refraction index was calculated and a ratio of which relative to the average refraction index was calculated as a degree of variability.

[Impact Strength]

Each sample film cut out from each of cutout portions was allowed to stand in an atmosphere of 23° C. and 65 RH % for 2 hours or more, then breaking strength was measured using a "Film impact tester TSS type" manufactured by Toyo Seiki Seisaku-Sho, Ltd. with hemispheric collision ball of 12.7 mm in diameter, and the strength was defined as impact strength. The average impact strength of all sample films was also calculated.

[Content Rate of Elastomer Component]

Each sample film cut out from each cutout portion was cut perpendicular to the surface and perpendicular to the winding-up direction and a super-thin section was fabricated, dyed with phosphotungstic acid and ruthenium oxide by a super-thin section method, and samples were prepared. Thereafter, samples were observed at X10000 magnification by JEOL transmission electron microscope and electron micrographs (about 160 mm in thickness direction X about 220 mm in winding direction) were taken. Then, by utilizing a JEOL image processing device (analySIS), the ratio of elastomer portions dyed by phosphotungstic acid and ruthenium oxide to the whole area was calculated as the content rate of elastomer component.

[Elastic Modulus in Tension]

Each sample film cutout from each cutout portion was sampled in a length of 150 mm and a width of 15 mm, and the sample was humidity-conditioned for 24 hours under a condition of 23° C. and 50% relative humidity. Then, under the conditions of 23° C. temperature and 50% relative humidity, in conformity to JIS K-7217 and using Autograph AG-100E available from Shimadzu Corporation, the humidity-conditioned film was gripped between chucks with 100 mm distance apart and pulled at a pulling rate of 200 mm/min, and the ratio of tensile stress in the tensile proportional limit to strain that corresponds thereto was calculated as the elastic modulus in tension.

[Lamination Processability]

Using another slit roll (obtained from the same mill roll) different from a slit roll by which the above-described boiling water shrinkage percentage, thickness irregularity in the longitudinal direction, refraction index and impact strength were measured, a laminated film roll with a three layer laminated structure consisting of polyamide based mixed resin/LDPE/LLDPE was obtained as follows: to a biaxially oriented film composing the slit roll, urethane based AC agent ("EL443" manufactured by Toyo-Morton, Ltd.) was coated, and then, on which LDPE (low density polyethylene) film of 15 μm in thickness was continuously extruded at 315° C. using a single test laminator apparatus manufactured by Modern Machinery Ltd., and further LLDPE (linear low density polyethylene) film of 40 μm in thickness was continuously laminated thereon. Also, processability in producing a laminated film roll was evaluated as the following three levels. Additionally, the temperature when lamination processability was evaluated was about 25° C. and the humidity was about 75% RH.

⊙: no wrinkle of roll occurs, so no need in adjustment of condition

Δ: wrinkle of roll eliminated by adjustment of condition x: wrinkle of roll still occurs in spite of any adjustment of condition

[Laminate Strength]

Also, a laminate film cut out from the laminate film roll was cut out in 15 mm wide and 200 mm long as a sample piece, and peel strength between polyamide based mixed resin laminated film layer and LDPE layer was measured under the conditions of temperature of 23° C. and relative humidity of 65% using "Tensiron UMT-II-500 type" manufactured by Toyo Boldwin Co. Ltd. Additionally, pulling rate was 10 cm/min., peeling angle was 180 degree, and the measurement was carried out with a peeling part immersed in water. Also, in the measurement of laminate strength, a first sample piece was cut out within 2 m from the winding end of laminate film roll, sample pieces of a second to 20th were cut out in approximately every 100 m from the first sample cutout portion, a 21st sample piece was cut out within 2 m from the winding start of film, and each sample piece from the first to the 21st was measured. The average of the measurements was also calculated.

[S-Shaped Curl Phenomenon]

As described above, the laminate film winded out as a laminate film roll was two folded parallel to the winding length direction while continuously conducting heat-sealing on each of both edges in 20 mm at 150° C. in the longitudinal direction using a test sealer manufactured by Nishibe Kikai Co. Ltd. Then, the film was intermittently heat-sealed at intervals of 150 mm in 10 mm in the perpendicular direction thereto to obtain a half-finished product with width of 200 mm. This product was cut in the winding length direction so that both edges have a sealed part of 10 mm, then cut at the boundary of the sealed part in the perpendicular direction thereto, and thereby to prepare a three-edge sealed bag (seal width: 10 mm). Of the three-edge sealed bags, the three-edge sealed bag prepared from the portion within 2 m from winding end of laminate film roll was selected as a first sample, and the three-edge sealed bags prepared from the portions being about 100, 200, . . . 1800, 1900 m apart from the prepared portion of the first sample were selected as a second to 20th sample, respectively, and the three-edge sealed bag prepared from the portion within 2 m from winding start of laminate film roll was selected as a 21st sample. Thereafter, these twenty-one three-edge sealed bags were thermally treated in boiling water for 30 minutes, then allowed to stand in an atmosphere of 23° C. and 65 RH % overnight, and further, the twenty-one three-edge sealed bags were overlapped, and 1 kg load was applied on the entire surface of bag from above, being kept overnight, and followed by removing the load. The degree of warpage of bag (S-shaped curl) was evaluated as follows.

⊚: no warpage at all

⊙: warpage is slightly observed x: warpage is apparently observed xx: remarkable warpage

[Pinhole Resistance]

A laminate film cut out from the above-mentioned laminate film roll was cut into a size of 20.3 cm (8 inch)×27.9 cm (11 inch), and the rectangular test film (laminate film) after cutting was allowed to stand under the condition of a temperature of 23° C. and 50% of relative humidity for at least 24 hours for conditioning. Thereafter, the rectangular test film was winded into a cylindrical shape in a length of 20.32 cm (8 inch). Then, one end of the cylindrical film was fixed to the outer circumference of a disk-shape fixed head of the Gelvo type Flex-Cracking Tester (Model No. 901 available from Rigaku Corporation which complied with the MIL-B-131C standard), and the other end of the cylindrical film was fixed to the outer circumference of a disk-shape movable head which was opposite to the fixed head at a distance of 17.8 cm (7 inch) The movable head of the tester was rotated at 440° while it was being brought closer by 7.6 cm (3.5 inch) in the fixed head direction along the axes of both heads opposite in parallel, and then, was allowed to go straight ahead by 6.4 cm (2.5 inch) without continuous rotating; then, these operations were reversely performed to return the movable head to the original position. This constituted one cycle of bend test. The bend test was continuously repeated at 40 cycles per minute by 3000 cycles. Thereafter, the number of pinholes generated at a portion within 17.8 cm (7 inches)×27.9 cm (11 inches) was counted, with the portions of the outer circumferences of the tested film excluded, to which the fixed head and the movable head were fixed (that is, the number of pinholes per 497 $cm^2$ (77 square inch) was counted).

Example 2

When chips A, B and D in each blender were supplied to a hopper just above the extruder No. 1 as well as the extruder No. 3 via a mixing mixer in forming the first layer and the third layer, the amount supplied of chip A was set to 96.0% by weight, the amount supplied of chip B was set to 1.0% by weight, and the amount supplied of chip D was set to 3.0% by weight, and at the same time, when chips A, B and D in each blender to a hopper just above the extruder No. 2 in forming the second layer, the amount supplied of chip A was set to 96.94% by weight, the amount supplied of chip B was set to 0.06% by weight and the amount supplied of chip D was set to 3.0% by weight. Except for these, all other conditions were same as those of Example 1 and a polyamide based mixed resin laminated film roll was obtained. Then, the characteristics of the obtained film roll were evaluated by the method same as that of Example 1. Tables 5 through 9 show the evaluation results.

Example 3

A polyamide based mixed laminated film roll was obtained in the same manner as in the case of Example 1, except for adjusting the discharge amounts of extruders No. 1 through No. 3 in such a manner that the thickness ratio of the first layer/the second layer/the third layer becomes 1/13/1 when materials were melt-extruded from the extruder No. 1 through No. 3 to form the unstretched laminated sheet. The lamination film obtained after biaxial stretching was thinly sliced in the thickness direction and observed by electron microscope, and the thicknesses of the first layer, the second layer, and the third layer were about 1 μm, about 13 μm, and about 1 μm, respectively. Then, the characteristics of the obtained film roll were evaluated by the method same as that of Example 1. Table 5 through 9 show the evaluation results.

Example 4

An unstretched film obtained in the same manner as in Example 1 was longitudinally stretched (first longitudinal stretching) at stretching temperature of about 90° C. and about 2.2 times by a Teflon (registered trademark) roll, and then longitudinally stretched (second longitudinal stretching) at stretching temperature of about 70° C. and about 1.5 times by a ceramic roll. Further, in the same manner as in Example 1, the longitudinally stretched sheet was continuously led to a stenter, and transversely stretched at about 130° C. and 4.0 times. Then, it was thermally fixed at about 210° C., subjected to transverse relaxation treatment of 5.0% and cooled. Then, by cutting the both edge parts to eliminate, a biaxially stretched film of about 15 μm and 2000 m or more continuously was formed. Additionally, the variation range of film surface temperature when the film was continuously produced was the same as in Example 1. The obtained film was slit and winded up in the same manner as in Example 1 and polyamide based laminated resin film was obtained. Then, the characteristics of the obtained film rolls were evaluated in the same methods as in Example 1. Tables 5 through 9 show the evaluation results.

Example 5

An unstretched film obtained in the same manner as in Example 1 was longitudinally stretched in two stages in the same manner as in Example 1. Thereafter, the longitudinally stretched sheet continuously led to a stenter, transversely stretched at about 130° C. and 3.6 times. Then, it was thermally fixed at about 215° C., subjected to transverse relaxation treatment of 3.0% and cooled. Then, by cutting the both edge parts to eliminate, a biaxially stretched film of about 15 μm and 2000 m or more continuously was formed. Additionally, the variation width of film surface temperature when the film was continuously produced was the same as in Example 1. The obtained film was slit and winded up in the same manner as in Example 1, and polyamide based mixed resin laminated film was obtained. Then, the characteristics of the obtained film roll were evaluated in the same methods as in Example 1. Tables 5 through 9 show the evaluation results.

Example 6

A polyamide based mixed lamination resin film roll was obtained in the same manner as in Example 1 except that the tilting angle of each hopper was changed to 65° when material chips in the blenders were supplied to the hopper just above each of extruders (extruder No. 1 through 3). Then, the characteristics of the obtained film roll were evaluated by the method same as that of Example 1. Tables 5 through 9 show the evaluation results.

Example 7

When chips A, B and D in each blender were supplied to a hopper just above the extruder No. 1 as well as the extruder No. 3 via a mixing mixer in forming the first layer and the third layer, the amount supplied of chip A was set to 89.5% by weight, the amount supplied of chip B was set to 0.5% by weight, and the amount supplied of chip D was set to 10.0% by weight, and at the same time, when chips A, B and D in each blender were supplied to a hopper just above the extruder No. 2 in forming the second layer, the amount supplied of chip A was set to 89.97% by weight, the amount supplied of chip B was set to 0.03% by weight and the amount supplied of chip D was set to 10.0% by weight. Except for these, all other conditions were same as those of Example 1 and a polyamide based mixed resin laminated film roll was obtained. Then, the characteristics of the obtained film roll were evaluated in the method same as that of Example 1. Tables 5 through 9 show the evaluation results.

Example 8

In forming first to third layers, material chip E was used in place of material chip D. In addition, when chips A, B and E in each blender were supplied to a hopper just above the extruder No. 1 as well as the extruder No. 3 via a mixing mixer in forming the first layer and the third layer, the amount supplied of chip A was set to 94.5% by weight, the amount supplied of chip B was set to 0.5% by weight, and the amount supplied of chip E was set to 5.0% by weight, and at the same time, when chips A, B and E in each blender were supplied to a hopper just above the extruder No. 2 via a mixing mixer in forming the second layer, the amount supplied of chip A was set to 94.97% by weight, the amount supplied of chip B was set to 0.03% by weight and the amount supplied of chip E was set to 5.0% by weight. Except for these, all other conditions were same as those of Example 1 and a polyamide based mixed resin laminated film roll was obtained. Additionally, in each extruder of Example 8, the average major axis, average minor axis, and average chip length of thermoplastic elastomer chip (chip E) were included in the range of within ±20%, respectively, with respect to the average major axis, average minor axis, and average chip length of each polyamide based resin chip (chips A and B). Then, the characteristics of the obtained film were evaluated by the method same as that of Example 1. Tables 5 through 9 show the evaluation results.

Example 9

A polyamide based mixed resin laminated film roll was obtained in the same manner as in Example 8 except that material chip F was used in place of material chip E. Additionally, in each extruder of Example 9, the average major axis, average minor axis, and average chip length of thermoplastic elastomer chip (chip F) were included in the range of within ±20%, respectively, with respect to the average major axis, average minor axis, and average chip length of each polyamide based resin chip (chips A and B). Then, the characteristics of the obtained film were evaluated by the method same as that of Example 1. Tables 5 through 9 show the evaluation results.

Example 10

A polyamide based mixed resin laminated film roll was obtained in the same manner as in Example 8 except that material chip G was used in place of material chip F. Additionally, in each extruder of Example 10, the average major axis, average minor axis, and average chip length of thermoplastic elastomer chip (chip G) were included in the range of within ±20%, respectively, with respect to the average major axis, average minor axis, and average chip length of each polyamide based resin chip (chips A and B). Then, the characteristics of the obtained film roll were evaluated by the method same as that of Example 1. Tables 5 through 9 show the evaluation results.

Example 11

A polyamide based mixed resin laminated film roll was obtained in the same manner as in Example 8 except that material chip H was used in place of material chip G. Additionally, in each extruder of Example 11, the average major axis, average minor axis, and average chip length of thermoplastic elastomer chip (chip H) were included in the range of within ±20%, respectively, with respect to the average major axis, average minor axis, and average chip length of each polyamide based resin chip (chips A and B). Then, the characteristics of the obtained film roll were evaluated by the method same as that of Example 1. Tables 5 through 9 show the evaluation results.

Comparative Example 1

A polyamide based mixed resin laminated film roll was obtained in the same manner as in the case of Example 1, except for adopting a single layer structure without forming the first and the third layers when an unstretched resin sheet was formed and when chips A, B, and D in each blender were fed into a hopper just above the extruder No. 2 via the mixing mixer in forming the second layer, the amount supplied of chip A was set to 96.5% by weight, the amount supplied of chip B was set to 0.5% by weight and the amount supplied of chip D was set to 3.0% by weight. Then, the characteristics of the obtained film roll were evaluated in the method same as that of Example 1. Tables 5 through 9 show the evaluation results.

Comparative Example 2

A polyamide based mixed resin laminated film roll was obtained in the same manner as in Example 1 except that material chip C was used in place of material chip B. Additionally, in Comparative Example 2, the average major axis and average chip length of thermoplastic elastomer chip (chip D) were not included in the range of within ±20%, respectively, with respect to the average major axis and average chip length of the other polyamide based resin chip (chip C). Then, the characteristics of the obtained film roll were evaluated by the method same as that of Example 1. Tables 5 through 9 show the evaluation results.

Comparative Example 3

A polyamide based mixed resin laminated film roll was obtained in the same manner as in Example 1 except that material chip I was used in place of material chip D. Additionally, in Comparative Example 3, the average major axis and average chip length of thermoplastic elastomer chip (chip I) were not included in the range of within ±20%, respectively, with respect to the average major axis and average chip length of each polyamide based resin chip (chip A and B). Then, the characteristics of the obtained film were evaluated by the method same as that of Example 1. Tables 5 through 9 show the evaluation results.

Comparative Example 4

A polyamide based mixed resin laminated film roll in Comparative Example 4 was obtained in the same manner as in Example 1 except that the tilting angle of each hopper was changed to 45° when material chips in the blenders were supplied to the hoppers just above each extruder (extruders No. 1 through No. 3). Then, the characteristics of the obtained film roll were evaluated by the method same as that of Example 1. Tables 5 through 9 show the evaluation results.

Comparative Example 5

A polyamide based mixed resin film roll was obtained in the same manner as in Example 1 except that material chips A, B, and D were allowed to stand for about 5 hours in each blender before supplying them to each hopper just above each extruder via a mixing mixer after pre-drying. Additionally, the moisture contents of chips A, B, and D just before they were supplied to each hopper were all 800 ppm, and the temperatures of chips A, B, and D right before they were fed into each hopper were all about 30° C. Then, the characteristics of the obtained film were evaluated by the method same as that of Example 1. Tables 5 through 9 show the evaluation results.

Comparative Example 6

A polyamide based mixed resin laminated film roll was obtained in the same manner as in Example 1 except that the pre-drying conditions of material chips A, B and D were changed to a method to heat to about 100° C. for about 4.0 hours. Additionally, when a predetermined amount of each sample was collected from each blender after pre-drying and the moisture content was measured, the moisture contents of chips A, B and D were all 1500 ppm, and the temperatures of chips A, B, and D just before they were supplied to hoppers just above each extruder via a mixing mixer were all about 85° C. And the characteristics of the obtained film were evaluated by the method same as that of Example 1. Tables 5 through 9 show the evaluation results.

Comparative Example 7

A polyamide based mixed resin laminated film roll was obtained in the same manner as in Example 1 except that no segregation inhibitor was added to each hopper when the material chips A, B and D were supplied to hoppers just above each extruder via a mixing mixer. Then, the characteristics of the obtained film roll were evaluated by the method same as that of Example 1. Tables 5 through 9 show the evaluation results.

Comparative Example 8

An unstretched film obtained in the same manner as in Example 1 was longitudinally stretched (first longitudinal stretching) at stretching temperature of about 90° C. and about 1.5 times by a Teflon (registered trademark) roll, then longitudinally stretched (second longitudinal stretching) at stretching temperature of about 70° C. and about 2.2 times by a ceramic roll. Further, the longitudinally stretched sheet was continuously led to a stenter, in the same manner as in Example 1, transversely stretched, thermally fixed, subjected to transverse relaxation treatment and cooled. Then, by cutting the both edge parts to eliminate, a biaxially stretched film of about 15 μm and 2000 m or more continuously was formed. Additionally, the variation width of film surface temperature when the film was continuously produced was the same as in Example 1. Thereafter, the obtained film was slit and winded up in the same manner as in Reference example 1 and polyamide based mixed resin laminated film rolls of was obtained. Then, the characteristics of the obtained film roll were evaluated in the same methods as in Example 1. Tables 5 through 9 show evaluation results.

TABLE 5

Characteristics of polyamide based resin film roll

| | Coefficient of dynamic friction | | | Haze | | | Surface roughness | | |
|---|---|---|---|---|---|---|---|---|---|
| | Average coefficient of dynamic friction | Maximum and minimum of coefficient of dynamic frictions of all samples | Degree of variability* of coefficient of dynamic friction to average coefficient of dynamic friction (%) | Average haze (%) | Maximum and minimum of haze of all the samples (%) | Degree of variability* of haze to average haze (%) | Average surface roughness (μm) | Maximum and minimum of surface roughness of all the samples (μm) | Degree of variability* of surface roughness to average surface roughness (%) |
| Example 1 | 0.62 | 0.77 | 24.2 | 2.7 | 2.4 | 11.1 | 0.042 | 0.046 | 9.5 |
| Example 2 | 0.43 | 0.51 | 18.6 | 3.8 | 3.5 | 7.9 | 0.050 | 0.055 | 10.0 |
| Example 3 | 0.64 | 0.80 | 25.0 | 2.2 | 2.4 | 9.1 | 0.040 | 0.047 | 17.5 |
| Example 4 | 0.57 | 0.72 | 26.3 | 2.6 | 2.3 | 11.5 | 0.041 | 0.046 | 12.2 |
| Example 5 | 0.53 | 0.62 | 17.0 | 3.2 | 2.9 | 9.4 | 0.045 | 0.048 | 6.7 |
| Example 6 | 0.67 | 0.58 | 13.4 | 2.8 | 2.5 | 10.7 | 0.043 | 0.050 | 16.3 |
| Example 7 | 0.66 | 0.78 | 18.2 | 3.6 | 3.9 | 8.3 | 0.044 | 0.049 | 11.4 |
| Example 8 | 0.58 | 0.51 | 12.1 | 2.4 | 2.2 | 8.3 | 0.040 | 0.046 | 15.0 |
| Example 9 | 0.62 | 0.72 | 16.1 | 3.6 | 3.3 | 8.3 | 0.043 | 0.039 | 9.3 |
| Example 10 | 0.57 | 0.69 | 21.1 | 3.8 | 3.5 | 7.9 | 0.044 | 0.049 | 11.4 |
| Example 11 | 0.58 | 0.50 | 13.8 | 2.4 | 2.6 | 8.3 | 0.040 | 0.046 | 15.0 |
| Comparative example 1 | 0.45 | 0.51 | 13.3 | 30.1 | 34.7 | 15.3 | 0.054 | 0.069 | 7.8 |
| Comparative example 2 | 0.62 | 0.86 | 38.7 | 2.6 | 2.1 | 19.2 | 0.039 | 0.049 | 25.6 |
| Comparative example 3 | 0.75 | 1.05 | 40.0 | 2.9 | 2.3 | 20.7 | 0.043 | 0.051 | 18.6 |
| Comparative example 4 | 0.67 | 0.89 | 32.8 | 2.7 | 3.2 | 18.5 | 0.041 | 0.051 | 24.4 |
| Comparative example 5 | 0.68 | 0.55 | 19.1 | 2.6 | 3.1 | 19.2 | 0.040 | 0.048 | 20.0 |
| Comparative example 6 | 0.67 | 0.83 | 23.9 | 2.7 | 2.9 | 7.4 | 0.042 | 0.046 | 9.5 |
| Comparative example 7 | 0.77 | 1.15 | 49.4 | 3.0 | 3.5 | 16.7 | 0.044 | 0.055 | 25.0 |
| Comparative example 8 | 0.68 | 0.83 | 22.1 | 2.7 | 3.1 | 14.8 | 0.037 | 0.046 | 24.3 |

*Degree of variability of coefficient of dynamic friction to average coefficient of dynamic friction: Of the maximum and minimum in coefficients of dynamic friction of all samples, the degree of variability was calculated by the one with larger difference from the average coefficient of dynamic friction.
*Degree of variability of haze to average haze: Of the maximum and minimum in hazes of all samples, the degree of variability was calculated by the one with larger difference from the average haze.
*Degree of variability of surface roughness to average surface roughness: Of the maximum and minimum in surface roughnesses of all samples, the degree of variability was calculated by the one with larger difference from the average surface roughness.

TABLE 6

Characteristics of polyamide based resin film roll

| | Silica content | | | Boiling water shrinkage percentage | | | Directional difference of boiling water shrinkage percentage | | |
|---|---|---|---|---|---|---|---|---|---|
| | Average silica content (%) | Maximum or minimum of silica content of all samples (%) | Degree of variability in silica conten to average silica conten* (%) | Average boiling water shrinkage percentage (BSax: %) | Maximum or minimum of maximum boiling water shrinkage percentage of all samples (%) | Degree of variability in maximum boiling water shrinkage percentage to average boiling water shrinkage percentage* (%) | Average directional difference of boiling water shrinkage percentage (BSad: %) | Maximum or minimum of directional difference of boiling water shrinkage percentage of all samples (%) | Degree of variability in directional difference of boiling water shrinkage percentage to average directional difference of boiling water shrinkage percentage* (%) |
| Example 1 | 0.022 | 0.023 | 4.5 | 3.3 | 3.5 | 6.1 | 1.4 | 1.5 | 7.1 |
| Example 2 | 0.045 | 0.042 | 6.7 | 3.5 | 3.7 | 5.7 | 1.6 | 1.4 | 12.5 |
| Example 3 | 0.013 | 0.012 | 7.7 | 3.2 | 3.1 | 3.1 | 1.6 | 1.4 | 12.5 |
| Example 4 | 0.022 | 0.020 | 9.1 | 3.0 | 3.2 | 6.7 | 1.6 | 1.7 | 6.3 |
| Example 5 | 0.022 | 0.021 | 4.5 | 2.8 | 2.7 | 3.6 | 1.6 | 1.8 | 12.5 |

TABLE 6-continued

Characteristics of polyamide based resin film roll

| | Silica content | | | Boiling water shrinkage percentage | | | Directional difference of boiling water shrinkage percentage | | |
|---|---|---|---|---|---|---|---|---|---|
| | Average silica content (%) | Maximum or minimum of silica content of all samples (%) | Degree of variability in silica conten to average silica conten* (%) | Average boiling water shrinkage percentage (BSax: %) | Maximum or minimum of maximum boiling water shrinkage percentage of all samples (%) | Degree of variability in maximum boiling water shrinkage percentage to average boiling water percentage* (%) | Average directional difference of boiling water shrinkage percentage (BSad: %) | Maximum or minimum of directional difference of boiling water shrinkage percentage of all samples (%) | Degree of variability in directional difference of boiling water shrinkage percentage to average directional difference of boiling water shrinkage percentage* (%) |
| Example 6 | 0.021 | 0.020 | 4.8 | 3.1 | 2.9 | 6.5 | 1.5 | 1.6 | 6.7 |
| Example 7 | 0.022 | 0.021 | 4.5 | 3.0 | 3.2 | 6.7 | 1.4 | 1.3 | 7.1 |
| Example 8 | 0.022 | 0.021 | 4.5 | 3.3 | 3.2 | 3.0 | 1.0 | 1.1 | 10.0 |
| Example 9 | 0.021 | 0.022 | 4.8 | 3.8 | 4.0 | 5.3 | 1.3 | 1.5 | 15.4 |
| Example 10 | 0.022 | 0.020 | 9.1 | 4.1 | 4.4 | 7.3 | 1.5 | 1.3 | 13.3 |
| Example 11 | 0.021 | 0.020 | 4.8 | 3.6 | 3.9 | 8.3 | 1.6 | 1.7 | 6.3 |
| Comparative example 1 | 0.066 | 0.072 | 9.1 | 4.2 | 4.5 | 7.1 | 1.4 | 1.6 | 14.3 |
| Comparative example 2 | 0.022 | 0.018 | 18.2 | 5.2 | 4.6 | 11.5 | 1.5 | 1.7 | 13.3 |
| Comparative example 3 | 0.021 | 0.019 | 9.5 | 4.3 | 4.9 | 14.0 | 2.1 | 2.5 | 19.0 |
| Comparative example 4 | 0.022 | 0.025 | 13.6 | 4.8 | 5.2 | 8.3 | 1.6 | 1.7 | 6.3 |
| Comparative example 5 | 0.022 | 0.020 | 9.1 | 5.0 | 4.5 | 10.0 | 1.7 | 1.9 | 11.8 |
| Comparative example 6 | 0.023 | 0.021 | 8.7 | 6.1 | 6.8 | 11.5 | 2.4 | 1.9 | 20.8 |
| Comparative example 7 | 0.022 | 0.021 | 4.5 | 4.7 | 4.2 | 10.6 | 1.8 | 2.4 | 33.3 |
| Comparative example 8 | 0.021 | 0.017 | 19.0 | 3.9 | 3.6 | 7.7 | 1.9 | 1.7 | 10.5 |

*Degree of variability in maximum silica content to average silica content: Degree of variability was calculated as a larger difference between either the maximum or the minimum of maximum silica content of all samples and the average boiling water shrinkage percentage.
*Degree of variability in maximum boiling water shrinkage percentage to average boiling water shrinkage percentage: Degree of variability was calculated as a larger difference between either the maximum or the minimum of maximum boiling water shrinkage percentage of all samples and the average boiling water shrinkage percentage.
*Degree of variability in directional difference of boiling water shrinkage percentage to average directional difference of boiling water shrinkage percentage: Degree of variability was calculated as a larger difference between either the maximum or the minimum of directional difference of boiling water shrinkage percentage of all samples and the average directional difference of boiling water shrinkage percentage.

TABLE 7

Characteristics of polyamide based resin film roll

| | Thickness | | | Refraction index | | |
|---|---|---|---|---|---|---|
| | Average thickness (μm) | Maximum or minimum of thickness throughout full length (μm) | Degree of variability in thickness to average thickness* (%) | Average refraction index (Nz) | Maximum or minimum of refraction indexes of all samples | Degree of variability in refraction index to average refraction index* (%) |
| Example 1 | 15.05 | 15.92 | 5.8 | 1.507 | 1.515 | 0.5 |
| Example 2 | 15.07 | 15.94 | 5.8 | 1.508 | 1.503 | 0.3 |
| Example 3 | 15.05 | 15.87 | 5.4 | 1.511 | 1.506 | 0.3 |
| Example 4 | 15.07 | 15.94 | 5.8 | 1.509 | 1.502 | 0.5 |
| Example 5 | 15.05 | 15.87 | 5.4 | 1.511 | 1.505 | 0.4 |
| Example 6 | 15.10 | 16.30 | 7.9 | 1.509 | 1.516 | 0.5 |
| Example 7 | 15.03 | 14.13 | 6.0 | 1.514 | 1.508 | 0.4 |
| Example 8 | 14.96 | 15.49 | 3.5 | 1.510 | 1.517 | 0.5 |
| Example 9 | 15.01 | 15.92 | 6.1 | 1.510 | 1.519 | 0.6 |
| Example 10 | 15.03 | 14.01 | 6.8 | 1.512 | 1.507 | 0.3 |
| Example 11 | 15.02 | 16.10 | 7.2 | 1.510 | 1.516 | 0.4 |
| Comparative example 1 | 15.08 | 16.01 | 6.2 | 1.508 | 1.499 | 0.6 |
| Comparative example 2 | 15.08 | 16.02 | 6.2 | 1.507 | 1.512 | 0.3 |

TABLE 7-continued

| | Characteristics of polyamide based resin film roll | | | | | |
|---|---|---|---|---|---|---|
| | Thickness | | | Refraction index | | |
| | Average thickness (μm) | Maximum or minimum of thickness throughout full length (μm) | Degree of variability in thickness to average thickness*(%) | Average refraction index (Nz) | Maximum or minimum of refraction indexes of all samples | Degree of variability in refraction index to average refraction index* (%) |
| Comparative example 3 | 15.03 | 12.96 | 13.8 | 1.502 | 1.518 | 1.1 |
| Comparative example 4 | 15.11 | 14.25 | 5.7 | 1.507 | 1.500 | 0.5 |
| Comparative example 5 | 15.08 | 13.53 | 10.3 | 1.509 | 1.516 | 0.5 |
| Comparative example 6 | 15.05 | 13.76 | 8.6 | 1.505 | 1.514 | 0.6 |
| Comparative example 7 | 14.99 | 12.88 | 14.1 | 1.502 | 1.514 | 0.8 |
| Comparative example 8 | 15.07 | 17.35 | 15.1 | 1.510 | 1.498 | 0.8 |

*Degree of variability in thickness to average thickness: Degree of variability was calculated as a larger difference between either the maximum or the minimum of thickness throughout the full length and the average length.
*Degree of variability in refraction index to average refraction index: Degree of variability was calculated as a larger difference between either the maximum or the minimum of refraction indexes of all samples and the average refraction index.

TABLE 8

| | Characteristics of polyamide based mixed resin laminated film roll | | | | | |
|---|---|---|---|---|---|---|
| | Elastomer content rate | | | Elastic modulus in tension | | |
| | Average elastomer content rate (%) | Maximum and Minimum in elastomer content rate of all samples (%) | Degree of variability of content rate relative to average content rate (%) | Average elastic modulus in tension (GPa) | Maximum and Minimum in elastic modulus in tension of all samples (GPa) | Degree of variability of elastic modulus in tension relative to average elastic modulus in tension* (%) |
| Example 1 | 2.9 | 2.7 | 6.9 | 1.90 | 2.05 | 7.9 |
| Example 2 | 2.9 | 2.7 | 6.9 | 1.92 | 2.00 | 4.2 |
| Example 3 | 2.9 | 3.0 | 3.4 | 1.92 | 2.05 | 6.8 |
| Example 4 | 2.9 | 2.7 | 6.9 | 1.95 | 2.10 | 7.7 |
| Example 5 | 2.9 | 2.7 | 6.9 | 1.85 | 2.00 | 8.1 |
| Example 6 | 3.1 | 2.8 | 9.7 | 1.90 | 2.00 | 5.3 |
| Example 7 | 10.1 | 9.5 | 5.9 | 1.55 | 1.65 | 6.5 |
| Example 8 | 5.0 | 5.2 | 4.0 | 2.10 | 2.00 | 4.8 |
| Example 9 | 4.8 | 4.5 | 6.3 | 1.75 | 1.60 | 8.6 |
| Example 10 | 5.0 | 4.7 | 6.0 | 1.75 | 1.60 | 8.6 |
| Example 11 | 4.9 | 5.2 | 6.1 | 2.10 | 1.95 | 7.1 |
| Comparative example 1 | 3.0 | 2.9 | 3.3 | 1.90 | 1.75 | 7.9 |
| Comparative example 2 | 2.8 | 2..6 | 7.1 | 2.05 | 1.95 | 4.9 |
| Comparative example 3 | 3.0 | 1.8 | 40.0 | 1.70 | 1.95 | 14.7 |
| Comparative example 4 | 2.9 | 3.2 | 10.3 | 1.83 | 2.15 | 17.5 |
| Comparative example 5 | 2.9 | 2.8 | 3.4 | 1.95 | 1.85 | 5.1 |
| Comparative example 6 | 3.0 | 3.1 | 3.3 | 1.90 | 2.05 | 7.9 |
| Comparative example 7 | 2.9 | 2.0 | 31.0 | 1.75 | 1.50 | 14.3 |
| Comparative example 8 | 3.0 | 2.9 | 3.3 | 2.15 | 2.00 | 7.0 |

*Degree of variability of content rate to average content rate: The degree of variability was caluculated by the use of a difference between the maximum or the minimum elastomer content rate of all samples and the average content, whichever larger.
*Degree of variability of elastic modulus in tension to average elastic modulus in tension: The degree of variability was calculated by the use of a difference between the maximum or the minimum elastic modulus in tension of all samples and the average elastic modulus in tension, whichever larger.

TABLE 9

| Sample | S-shaped curl Total | S-shaped curl numbers each of ◎, ○, X | Impact strength (kg/cm) Average | Impact strength Variation range | Laminate strength (g/15 mm) Average | Laminate strength Variation range | Lamination processability | Pinhole resistance (pcs./497 cm²) Average value | Pinhole resistance min.-max. |
|---|---|---|---|---|---|---|---|---|---|
| Example 1 | ◎ | ◎...18, ○...3 | 13.8 | 13.0-14.1 | 200 | 190-210 | ○ | 3 | 1-5 |
| Example 2 | ◎ | ◎...14, ○...7 | 13.1 | 12.5-13.4 | 210 | 200-220 | ○ | 2 | 0-3 |
| Example 3 | ◎ | ◎...16, ○...5 | 14.1 | 13.4-14.5 | 210 | 190-220 | ○ | 3 | 2-5 |
| Example 4 | ○ | ◎...9, ○...12 | 13.3 | 13.0-13.5 | 200 | 190-210 | ○ | 3 | 1-4 |
| Example 5 | ○ | ◎...8, ○...13 | 14.5 | 13.8-14.9 | 240 | 220-250 | ○ | 3 | 0-5 |
| Example 6 | ◎ | ◎...18, ○...3 | 13.5 | 13.1-13.9 | 200 | 190-210 | ○ | 3 | 1-5 |
| Example 7 | ◎ | ◎...18, ○...3 | 12.3 | 12.0-13.0 | 170 | 150-180 | ○ | 0 | 0 |
| Example 8 | ◎ | ◎...21 | 12.5 | 12.1-12.9 | 230 | 230-250 | ○ | 5 | 3-7 |
| Example 9 | ◎ | ◎...19, ○...2 | 13.9 | 12.6-14.3 | 190 | 180-200 | ○ | 3 | 1-5 |
| Example 10 | ◎ | ◎...18, ○...3 | 13.5 | 13.0-14.1 | 170 | 150-180 | ○ | 2 | 1-4 |
| Example 11 | ◎ | ◎...16, ○...5 | 12.0 | 11.5-12.3 | 250 | 220-250 | ○ | 5 | 3-7 |
| Comparative example 1 | ○ | ◎...9, ○...12 | 14.0 | 13.3-14.3 | 220 | 200-240 | ○ | 3 | 1-4 |
| Comparative example 2 | ○ | ◎...6, ○...15 | 13.4 | 12.6-13.8 | 200 | 170-250 | Δ | 3 | 1-5 |
| Comparative example 3 | X | ○...5, X...16 | 12.3 | 10.6-13.0 | 130 | 120-170 | X | 12 | 0-25 |
| Comparative example 4 | ○ | ◎...9, ○...12 | 13.3 | 12.9-13.7 | 210 | 200-230 | Δ | 7 | 4-11 |
| Comparative example 5 | ○-X | ◎...1, ○...8, X...12 | 13.7 | 12.8-14.1 | 230 | 170-260 | Δ | 7 | 2-13 |
| Comparative example 6 | ○-X | ○...5, X...16 | 12.9 | 11.9-13.6 | 210 | 170-240 | X | 7 | 3-12 |
| Comparative example 7 | ○-X | ◎...9, X...12 | 12.2 | 10.8-13.2 | 150 | 130-170 | Δ | 9 | 2-16 |
| Comparative example 8 | ○-X | ◎...2, ○...6, X...13 | 13.9 | 12.7-14.7 | 200 | 150-220 | X | 8 | 4-15 |

[Effect of Film in Examples]

It is known from Tables 5 to 9 that all the film rolls of Examples have a very small thickness irregularity over the entire roll in the longitudinal direction, and a small variation of elastomer content as well as physical properties such as elastic modulus in tension, boiling water shrinkage percentage, refraction index, coefficient of dynamic friction under the high humidity. Also, it is known that all such film rolls of Examples having a small variation of elastomer content rate as well as physical properties such as elastic modulus in tension do not give rise to any S-shaped curl phenomenon and have an excellent lamination processability even under high humidity (75% RH), and achieve small variations of pinhole resistance. Moreover, it is known that the films composing film rolls of Examples provide superb pinhole resistance, impact strength (toughness) and high laminate strength. In contrast, it is known that film rolls of Comparative Examples have a large thickness irregularity over the entire roll in the longitudinal direction and a large variation of physical properties such as elastomer content, elastic modulus in tension, boiling water shrinkage percentage, refraction index, coefficient of dynamic friction under high humidity, develop large variation in pinhole resistance or an S-shaped curl phenomenon, and achieve poor lamination processability.

INDUSTRIAL APPLICABILITY

A polyamide based mixed resin laminated film roll of the present invention can be preferably used in an application of retort processing for food since it provides excellent processability as described above.

The invention claimed is:

1. A polyamide based mixed resin laminated film roll formed by winding up of the polyamide based mixed resin laminated film formed by laminating multiple polyamide based resin sheets composed of a mixed resin consisting of polyamide based resin and thermoplastic elastomer in a width of 0.2 m or more to 3.0 m or less, and a length of 300 m or more to 30000 m or less, wherein when the polyamide based mixed resin laminated film roll has a first sample cutout portion set up within 2 m from the winding end of film; and a final cutout portion set up within 2 m from the winding start of film, as well as has a sample cutout portion set up in approximately every 100 m from the first sample cutout portion, the polyamide based mixed resin laminated film roll satisfies the following requirements (1) and (2):

(1) when the content of thermoplastic elastomer composition is measured and the average content rate which is the average value of these content rates is calculated, the degree of variability of the content of the thermoplastic elastomer constituent of all the samples is within the ±10% range with respect to the average content rate; and (2) the degree of variability of thickness throughout the full length in the longitudinal direction of a wound-up roll is within the range of ±2% to ±10% with respect to the average thickness, wherein the skin layer of the polyamide based mixed resin film wound up comprises 0.05 to 2.0% by weight inorganic particles, wherein the amount of thermoplastic elastomer of the polyamide based mixed resin film wound up is 1.0 to 15% by weight, wherein the thermoplastic elastomer of the polyamide based mixed resin film wound up is selected from polyamide based elastomers of block or random copolymers of polyamide based resin and polytetramethylene glycol or polyethylene glycol, wherein the polyamide based mixed resin laminated film is a film comprising a configuration of A/B/A or a film comprising a configuration of A/B/C, wherein A, B, and C represent A layer, B layer, and C layer, respectively, and wherein the sum of the thickness of the two A layers in the film comprising a configuration of A/B/A or the A-layer and C-layer in the film comprising a configuration of A/B/C is between 5% and 30% of the total thickness of the polyamide based mixed resin laminated film.

2. The polyamide based mixed resin laminated film roll according to claim 1, wherein when the elastic modulus in tension in the film wound-up direction is measured for each sample cut out from each of the cutout portions, the average elastic modulus in tension which is the average value of elastic moduli of the samples, is 1.30 GPa or more and less than 2.50 GPa and at the same time the degrees of variability of all samples are included in the range of ±10% with respect to the average elastic modulus in tension.

3. The polyamide based mixed resin laminated film roll according to claim 1, wherein the number of pinholes when a 3000-cycle bending test is continuously carried out on each sample cut out from each cutout portion at the speed of 40 cycles per minute using a Gelvo type Flex-Cracking Tester is 10 or less in all cases.

4. The polyamide based mixed resin laminated film roll according to claim 1, wherein when a maximum boiling water shrinkage percentage of each sample cut out from each of the cutout portions is measured, the maximum boiling water shrinkage percentage being the maximum value of boiling water shrinkage percentages in all directions, an average boiling water shrinkage percentage, which is an average value, of the maximum boiling water shrinkage percentages is 2% to 6%, and a degree of variability in the maximum boiling water shrinkage percentages of all samples is within a range of ±2% to ±10% relative to the average boiling water shrinkage percentage.

5. The polyamide based mixed resin laminated film roll according to claim 1, wherein when a directional difference of boiling water shrinkage percentage, which is the absolute value of the difference between a boiling water shrinkage percentage in the direction of +45° to the longitudinal direction and a boiling water shrinkage percentage in the direction of −45° to the longitudinal direction, of each sample cut out from each of the cutout portions is measured, an average directional difference of boiling water shrinkage percentage which is the average of the directional differences of boiling water shrinkage percentage is 2.0% or less, and a degree of variability in the directional differences of boiling water shrinkage percentage of all samples is within a range of ±2% to ±30% relative to the average directional difference of boiling water shrinkage percentage.

6. The polyamide based mixed resin laminated film roll according to claim 1, wherein each sample cut out from each cutout portion satisfies the following requirements (5) and (6):

(5) when each sample cut out from each cut out portion is measured for the three-dimensional surface roughness in the winding-up direction, the average surface roughness which is the average value of three-dimensional surface roughness of all the samples is within a range of 0.01 to 0.06 μm, and a degree of variability of three-dimensional surface roughness of all the samples is within a range of ±5% to ±20% relative to the average surface roughness; and (6) when each sample cut out from each cut out portion is measured for the haze, the average haze which is the average value of hazes of all the samples is within a range of 1.0 to 4.0 and at the same time a degree of variability of haze of all the samples is within a range of ±2% to ±15% relative to the average haze.

7. The polyamide based mixed resin laminated film roll according to claim 1, wherein when a coefficient of dynamic friction is measured for each sample cut out from each cutout portion under the atmosphere of 23° C. and 80% RH, the average coefficient of dynamic friction which is the average value of coefficients of dynamic friction of the samples is within a range of 0.3 to 0.8 and at the same time a degree of variability of the coefficient of dynamic friction of all the samples is within a range of ±5% to ±30% to the average coefficient of dynamic friction.

8. The polyamide based mixed resin laminated film roll according to claim 1, wherein when the content of inorganic particles is measured for each sample cut out from each cutout portion, the average content which is the average value of the content of inorganic particles is within a range of 0.01 to 0.5% by weight and at the same time a degree of variability of the content of inorganic particles of all the samples is within a range of ±2% to ±10% to the average content of inorganic particles.

9. The polyamide based mixed resin laminated film roll according to claim 1, wherein when refraction index in the thick direction of each sample cut out from each of the cutout portions is measured, an average refraction index which is the average value of the refraction indexes is 1.500 or more, 1.520 or less, and a degree of variability in the refraction indexes of all samples is within a range of ±2% relative to the average refraction index.

10. The polyamide based mixed resin laminated film roll according to claim 1, wherein the polyamide based mixed resin laminated film wound up has the average particle size of inorganic particles in the ⅓ part of the total thickness close to the top surface of the film and the bottom surface of the film are made smaller than the average particle size of inorganic particles in the rest part.

11. The polyamide based mixed resin laminated film roll according to claim 1, wherein the major component of polyamide composing the polyamide based mixed resin laminated film roll is nylon 6.

12. The polyamide based mixed resin laminated film roll according to claim 1, wherein a polyamide based mixed resin laminated film wound up is formed from a mixture of two or more different types of polyamide based resin.

13. The polyamide based mixed resin laminated film roll according to claim 1, wherein a polyamide based mixed resin film wound up is laminated with a polyolefin based resin film.

14. The polyamide based mixed resin laminated film roll according to claim 1, wherein a polyamide based mixed resin laminated film formed by biaxially stretching an unoriented sheet-like material obtained by extruding melted polyamide based resin from a T-die and being brought in contact with a metal roll to cool is wound up.

15. The polyamide based mixed resin laminated film roll according to claim 1, wherein a polyamide based mixed resin laminated film wound up is stretched by a tenter stretching method.

16. The polyamide based mixed resin laminated film roll according to claim 1, wherein a polyamide based mixed resin laminated film wound up is sequentially biaxially stretched.

17. The polyamide based mixed resin laminated film roll according to claim 1, wherein a polyamide based mixed resin laminated film biaxially stretched in the longitudinal direction and in the transverse direction is wound up.

18. The polyamide based mixed resin laminated film roll according to claim 1, wherein a polyamide based mixed resin film wound up is a practically unoriented sheet-like substance of polyamide based resin stretched in at least two stages in the longitudinal direction to be threefold or more at a higher temperature than the glass transition temperature of the polyamide based resin plus 20° C., and then stretched in the transverse direction to be threefold or more.

19. The polyamide based mixed resin laminated film roll according to claim 1, wherein a polyamide based mixed resin film wound up is thermally fixed after a final stretching treatment.

20. The polyamide based mixed resin laminated film roll according to claim 1, wherein a polyamide based mixed resin laminated film wound up is treated with relaxing after a thermal fixation.

21. The polyamide based mixed resin laminated film roll according to claim 1, wherein at least one kind selected from lubricant, anti-blocking agent, thermal stabilizer, antioxidant, antistatic agent, light resistant agent and impact modifier is added into the polyamide based mixed resin laminated film wound up.

22. The polyamide based mixed resin laminated film roll according to claim 1, wherein an inorganic particle is added into the polyamide based mixed resin laminated film wound up.

23. The polyamide based mixed resin laminated film roll according to claim 1, wherein a higher fatty acid is added into the polyamide based mixed resin laminated film wound up.

24. A production method of the polyamide based mixed resin laminated film roll described in claim 1, comprising:
a film forming step of forming unstretched polyamide based mixed resin laminated sheet by melt-extruding mixed resin composed of polyamide based resin and thermoplastic elastomer from multiple extruders by co-extrusion method; and
a biaxially stretching step of the unstretched polyamide based mixed resin laminated sheet obtained in the film forming process in the longitudinal direction and in the transverse direction,
wherein the production method satisfies the following requirements from (a) to (f):
(a) The film forming step includes melt extrusion after polyamide based resin chips and thermoplastic elastomer chips are mixed, wherein mixing of the polyamide resin chips and thermoplastic elastomer chips is performed with a sublimation segregation inhibitor added;
(b) The film forming step is to mix polyamide based resin chips and thermoplastic elastomer chips, and to laminate polyamide based mixed resin sheets with inorganic particles added 0.1 to 2.0% by weight on the uppermost superficial layer;
(c) The biaxially stretching process is to stretch the unstretched polyamide based mixed resin laminated sheet in the transverse direction after stretching in the longitudinally direction in two stages, and the stretching ratio of the first stage in two-stage stretching in the longitudinal direction is set to be higher than the stretching ratio of the second stage;
(d) The film forming step is to melt-extrude from each extruder after mixing polyamide based resin chips and thermoplastic elastomer chips, wherein the shape of each chip used is elliptic cylinder having elliptic cross section with a major axis and a minor axis, and the thermoplastic elastomer chips are adjusted to those having average major axis, average minor axis and average chip length to be within a range of ±25% relative to the average major axis, average minor axis and average chip length of the polyamide based resin chips;
(e) The film forming step includes a melt extrusion step using multiple extruders equipped with a funnel-shape hopper as a material chip feeder unit, wherein the inclination angles of the funnel-shape hoppers are all adjusted to 65 degrees or more and the moisture content of polyamide based resin chips before being fed into the funnel-shape hoppers is adjusted to be 800 ppm or more and 1000 ppm or less, and at the same time, the temperature of polyamide based resin chips before being fedinto the funnel-shape hoppers is adjusted to 80° C. or higher;
(f) The film forming step includes a step for cooling the polyamide based mixed resin laminated sheet melt-extruded from the multiple extruders by co-extrusion method and by winding up around a cooling roll, wherein in the cooling step, the portion of the polyamide based mixed resin laminated sheet to which the cooling roll surface comes into contact is attracted in a direction opposite to the winding-up direction by a suction device throughout the full width of the polyamide based mixed resin laminated sheet.

25. The polyamide based mixed resin laminated film roll according to claim 1, wherein the sum of the thickness of the two A layers in the film comprising a configuration of A/B/A or the A-layer and C-layer in the film comprising a configuration of A/B/C is between 10% and 20% of the total thickness of the polyamide based mixed resin laminated film.

26. The polyamide based mixed resin laminated film roll according to claim 1, wherein the sum of the thickness of the two A layers in the film comprising a configuration of A/B/A or the A-layer and C-layer in the film comprising a configuration of A/B/C is between 12% and 18% of the total thickness of the polyamide based mixed resin laminated film.

27. The polyamide based mixed resin laminated film roll according to claim 22, wherein the inorganic particle is a silica particle of 0.5-5.0 μm in an average diameter.

28. The process for producing the polyamide-based resin laminated film roll according to claim 24, wherein the film forming step is to laminate a skin layer added with 0.05 to 2.0% by weight of inorganic particles on a core layer by utilizing high-concentration material chips.

29. The process for producing the polyamide based resin laminated film roll according to claim 24, wherein the high-concentration material chips used in the film forming process are polyamide based resin chips with inorganic particles added by 5% by weight or more and less than 20% by weight.

30. The process for producing the polyamide based resin laminated film roll according to claim 24, wherein the inorganic particles added to the polyamide based resin sheet to be laminated on the uppermost layer has the pore volume of 0.5 to 2.0 mL/g and the average grain size of 1.0 to 5.0 μm.

31. The process for producing the polyamide based mixed resin laminated film roll according to claim 24, a process further including a preheating process executed before the longitudinal stretching process and a heat-treatment process executed after the longitudinal stretching process, wherein a variation width of surface temperature of film at any point of the longitudinal stretching process, the preheating process and the heat-treatment process is adjusted throughout the full length of the film within a range of +1° C. to the average temperature.

* * * * *